(12) United States Patent
Svendsen et al.

(10) Patent No.: US 11,139,868 B2
(45) Date of Patent: Oct. 5, 2021

(54) PROPAGATION LINK SELECTION IN TELECOMMUNICATION SYSTEMS

(71) Applicant: Nokia Technologies Oy, Espoo (FI)

(72) Inventors: Simon Svendsen, Aalborg (DK); Christian Rom, Aalborg (DK); Jun Tan, Glenview, IL (US); Poul Olesen, Støvring (DK)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/680,534

(22) Filed: Nov. 12, 2019

(65) Prior Publication Data

US 2021/0143875 A1     May 13, 2021

(51) Int. Cl.
*H04B 7/0456*     (2017.01)
*H04B 7/0417*     (2017.01)

(52) U.S. Cl.
CPC ......... *H04B 7/0456* (2013.01); *H04B 7/0417* (2013.01)

(58) Field of Classification Search
CPC .................................................. H04B 7/0456
USPC ........................................................ 375/267
See application file for complete search history.

(56) References Cited

U.S. PATENT DOCUMENTS

| | | | |
|---|---|---|---|
| 9,635,677 B1* | 4/2017 | Liu | H04L 1/0003 |
| 9,660,348 B2 | 5/2017 | Shamblin et al. | |
| 10,263,337 B1 | 4/2019 | Daly | |
| 2011/0141916 A1* | 6/2011 | Inohiza | H04B 7/2606 370/246 |
| 2012/0213111 A1* | 8/2012 | Shimezawa | H04L 1/20 370/252 |
| 2016/0087705 A1* | 3/2016 | Guey | H04L 5/0053 370/336 |
| 2017/0188379 A1* | 6/2017 | Shtrom | H04L 5/0023 |
| 2018/0062724 A1 | 3/2018 | Onggosanusi et al. | |
| 2018/0199258 A1 | 7/2018 | Cezanne et al. | |
| 2019/0069333 A1* | 2/2019 | Kim | H04W 36/0033 |

(Continued)

FOREIGN PATENT DOCUMENTS

| | | |
|---|---|---|
| WO | 2019/004882 A1 | 1/2019 |
| WO | 2019/036531 A1 | 2/2019 |

OTHER PUBLICATIONS

Alamouti et al., "A Simple Transmit Diversity Technique for Wireless Communications", IEEE Journal on Selected Areas in Communications, vol. 16, No. 8, Oct. 1998, pp. 1451-1458.

(Continued)

*Primary Examiner* — Lihong Yu

(57) ABSTRACT

The disclosure presents a method and system for enabling the monitoring of more than one propagation link (PL) between two transceivers, such as a fifth-generation (5G) broadband cellular base station (gNB) and user equipment (UE). The PL can represent a radiation pattern emitted by a MIMO antenna port. The monitoring can capture and record PL quality parameters and associate them to a PL index (PLI). The process can periodically cycle through the set of available PLs and select a best fit PLI configuration. The best fit PLI can be one that satisfies a link quality threshold and PL efficiency thresholds. The selected PLI can be communicated to both transceivers using parameter containers added to conventional control signals. Data messages communicated between the transceivers can utilize the selected best fit PLI configuration.

20 Claims, 14 Drawing Sheets

(56) References Cited

U.S. PATENT DOCUMENTS

2019/0166608 A1  5/2019  Kumar et al.
2019/0181941 A1  6/2019  Kim et al.
2019/0190624 A1  6/2019  Kyosti et al.

OTHER PUBLICATIONS

Mehta et al., "A Star Patch Antenna for Generating Multiple Radiation Patterns", Microwave and Optical Technology Letters, vol. 50, No. 7, Jul. 2008, pp. 1908-1910.
Dumanli, "A Radiation Pattern Diversity Antenna Operating at the 2.4 Ghz ISM Band", IEEE Radio and Wireless Symposium (RWS), Jan. 25-28, 2015, pp. 102-104.
Haraz et al., "8×8 Patch Antenna Array with Polarization and Space Diversity for Future 5G Cellular Applications", International Conference on Information and Communication Technology Research (ICTRC), May 17-19, 2015, pp. 255-258.
"Final Report of 3GPP TSG RAN WG1 #95 v1.0.0", 3GPP TSG-RAN WG Meeting #96, R1-1901482, MCC Support, Feb. 25-Mar. 1, 2019, pp. 1-172.
"Final Report of 3GPP TSG RAN WG1 #AH_1901 v1.0.0", 3GPP TSG-RAN WG Meeting #96, R1-1901483, MCC Support, Feb. 25-Mar. 1, 2019, pp. 1-104.
"Updated Feature Lead Summary of Enhancements on Multi-beam Operations", 3GPP TSG-RAN WG1 Ad-Hoc Meeting #1901, R1-1901430, LG Electronics, Jan. 21-25, 2019, pp. 1-33.
Almasi et al., "Reconfigurable Antennas in mmWave MIMO Systems", Signal Processing, arXiv:1710.05111v2 [eess. SP], Oct. 24, 2017, pp. 1-12.

\* cited by examiner

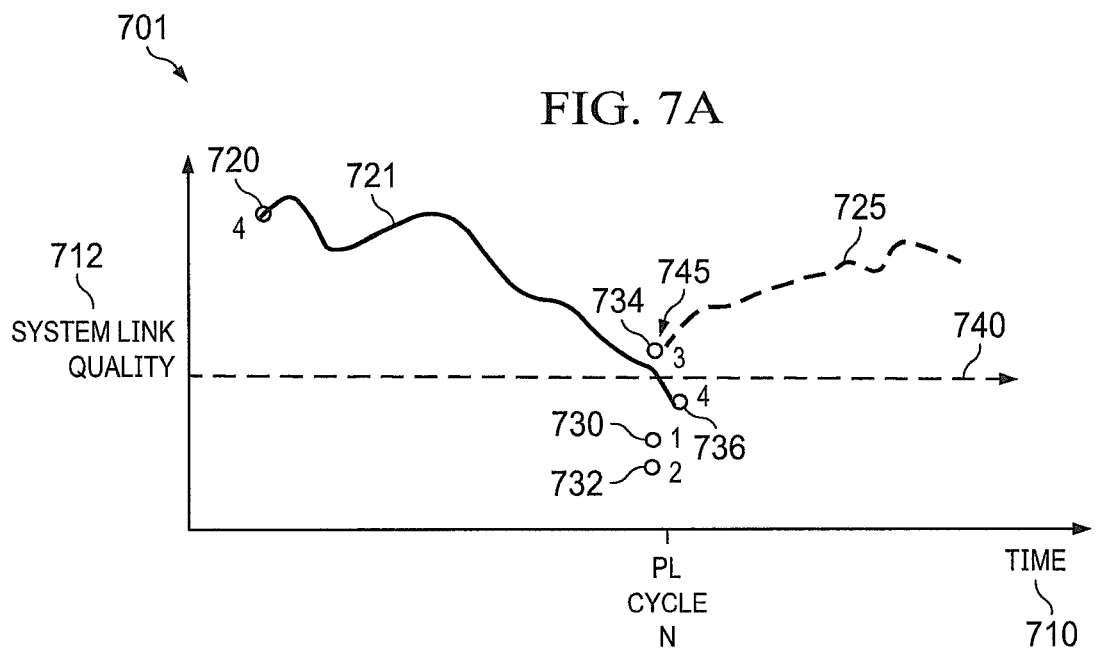
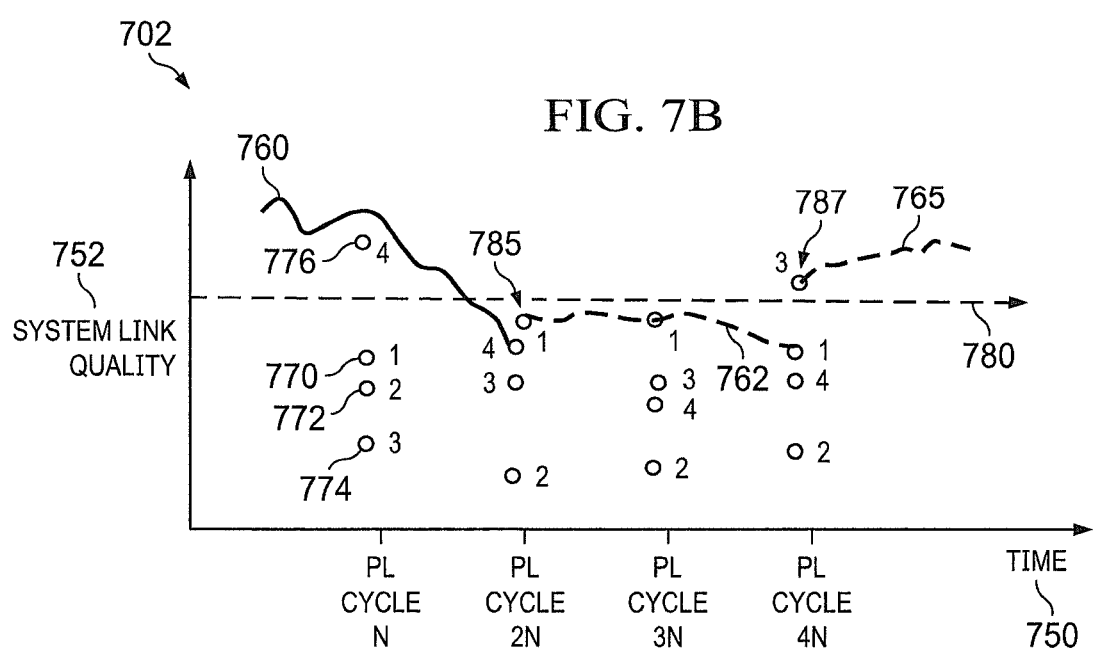

PROPAGATION LINK SELECTION IN TELECOMMUNICATION SYSTEMS

TECHNICAL FIELD

This application is directed, in general, to a broadband cellular network under 3GPP Rel. 15 and, more specifically, to selecting a transmission propagation link.

BACKGROUND

The throughput for fourth-generation broadband cellular network (4G) frequency range one (FR1) (410 mega hertz (MHz)-7125 MHz) wireless systems has been increased by adding multiple transceivers (MIMO) at the base station (gNB) and at the user equipment (UE), e.g., mobile device, where each MIMO branch is connected to a static antenna. These systems rely on a highly dynamic multi-path environment behavior typically present at these frequencies. A high efficiency and low envelope correlation is the main focus area for antennas implemented for such communication systems. The antenna radiation patterns at the gNB are designed to cover a certain sector, whereas the antenna radiation patterns at the UE are typically not part of a design parameter, since it may be impractical to control and difficult to predict the best direction.

The approach for fifth-generation broadband cellular network (5G) new radio (NR) frequency range two (FR2) (24250 MHz-52600 MHz) for mmWave is different, since it relies on line of sight operation and high antenna gain at the gNB and the UE to counteract the increased path loss due to the higher frequency. This necessitates the high gain beams at the gNB, and possibly at the UE, be steered in the right direction to adapt to mobility and changes in the environment. The current third-generation partnership program release 15 (3GPP Rel. 15) specifies monitoring one propagation link, e.g., radiation pattern, between an antenna port at the gNB and an antenna port at the UE. Greater flexibility over propagation links would be beneficial.

SUMMARY

In one aspect, a method is disclosed. In one embodiment the method includes: (1) transmitting a first propagation link (PL) index (PLI) configuration, from a set of available PLs, in a downlink or uplink control signal from a first transceiver to a second transceiver, wherein the first transceiver is one of a base station (gNB) or a user equipment (UE) and the second transceiver is another one of the gNB or the UE, (2) recording, at the first transceiver, a received first PL quality parameter associated with the first PLI configuration, as part of a set of system link quality parameters, wherein the first PL quality parameter is estimated at the second transceiver utilizing an analysis of the control signal using the first PLI configuration, (3) selecting a first best fit PLI configuration from the set of system link quality parameters, and (4) sending a subsequent indication from the first transceiver identifying the first best fit PLI configuration, and the second transceiver utilizes the first best fit PLI configuration for ensuing communications.

In a second aspect, a system is disclosed. In one embodiment the system includes: (1) a first transceiver capable of transceiving reference signals and control signals using a PLI configuration, (2) a second transceiver communicatively coupled to the first transceiver and capable of transceiving reference signals and control signals using a first transceiver PLI configuration, and (3) wherein the first transceiver further comprises: a PLI analyzer capable of recording PL quality parameters as a set of system link quality parameters, wherein the PL quality parameters are determined at the first transceiver or the second transceiver, and selecting one or more best fit PLI configurations to be utilized by the first transceiver and the second transceiver, wherein the selecting utilizes the set of system link quality parameters, a link quality threshold, and a PL efficiency threshold.

In a third aspect, a computer program product having a series of operating instructions stored on a non-transitory computer-readable medium that directs a data processing apparatus when executed thereby to perform operations is disclosed. In one embodiment the operations include: (1) directing a transmission of a first PLI configuration, from a set of available PLs, in a downlink or uplink control signal from a first transceiver to a second transceiver, wherein the first transceiver is one of a gNB or a UE and the second transceiver is an other one of the gNB or the UE, (2) recording, at the first transceiver, a received first PL quality parameter associated with the first PLI configuration, as part of a set of system link quality parameters, wherein the first PL quality parameter is estimated at the second transceiver utilizing an analysis of the control signal using the first PLI configuration, (3) selecting a first best fit PLI configuration from the set of system link quality parameters, and (4) scheduling the first transceiver to send a subsequent indication from the first transceiver identifying the first best fit PLI configuration, and the second transceiver utilizes the first best fit PLI a configuration for ensuing communications.

BRIEF DESCRIPTION

Reference is now made to the following descriptions taken in conjunction with the accompanying drawings, in which:

FIG. 7A is an illustration of a plot diagram of an example PL chart demonstrating selecting a PL utilizing a link quality threshold;

FIG. 7B is an illustration of a plot diagram of an example PL chart demonstrating selecting a PL where all PLs are below the link quality threshold;

DETAILED DESCRIPTION

Figure 1A:
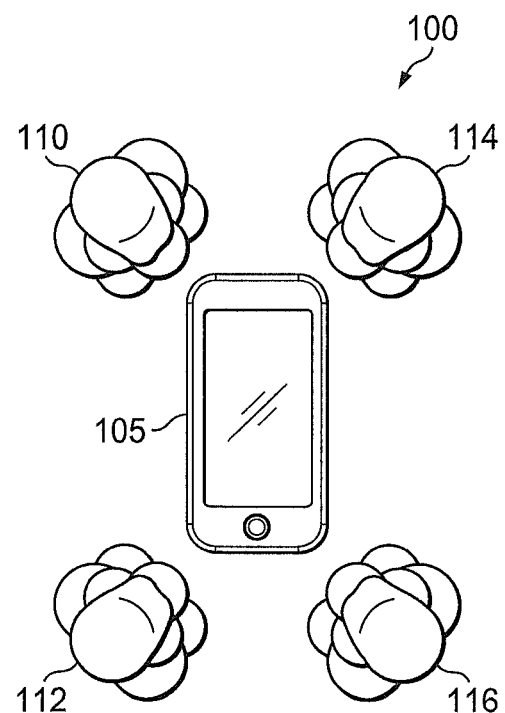
FIG. 1A is an illustration of a diagram of an example user equipment (UE) with multiple antennas.

The third-generation partnership program release 15 (3GPP Rel. 15), as described at 3GPP.org, specifies reference signals and control signals, which can be used to assist a beam steering capable fifth-generation broadband cellular network (5G) base station (gNB) to align its beam towards a user equipment (UE), such as a mobile device. These control signals include synchronization signal block (SSB), downlink control information (DCI), and uplink control information (UCI), and these reference signals include channel state information (CSI) reference signals (CSI-RS), demodulation reference signals (DMRS), and sounding reference signal (SRS). The SSB is a collection of references signals (for example, four, eight, or sixty-four) transmitted from the gNB in different spatial directions as part of the 3GPP Rel. 15 beam alignment procedure (see specifically phase 1 and phase 2 of the 3GPP Rel. 15).

The CSI-RS is sent from the gNB to the UE, for the UE to calculate the CSI communication parameters of the downlink propagation environment including a channel quality indicator (CQI), precoding matrix indicator (PMI), a rank indicator (RI), and other CSI parameters. The calculated CSI is sent to the gNB via the UCI. The gNB uses these received channel information to determine the coding of a data message, e.g., a message packet that is not directed toward maintaining the communication link between the gNB and UE, and informs the UE via the DCI. The control signals and data messages can be referred to as communications.

The CSI-RS can also be used in the second phase of the 3GPP Rel. 15 beam alignment procedure to refine the gNB beam toward the UE. The third phase of the 3GPP Rel. 15 beam alignment procedure provides for a process where the UE can ask the gNB to repeat the same CSI-RS with static beam configuration to assist the UE to align its beam towards the gNB.

The SRS is sent from the UE to the gNB for the gNB to calculate the properties of the uplink propagation link. The SRS recourse indicator (SRI) is an index used at the UE for SRS toggling where the UE can transmit SRS from different multiple input multiple output (MIMO) branches, for the gNB to select one or more MIMO branches for uplink.

The 5G new radio (NR) 3GPP Rel. 15 specifies channel estimation procedures that uses specific control signals (such as CSI-RS from the gNB and SRS from the UE) to enable the characterization of one propagation link (PL) between an antenna port on the gNB and an antenna port at the UE. This is independent of whether or not the gNB and the UE are capable of beam steering by having an antenna array connected to the antenna port. A PL can be a radiation pattern, a propagation radiation pattern, an antenna transmit pattern, an analog propagation beam, or an analog spatial filter.

The current 3GPP Rel. 15 allows for monitoring only one PL between an antenna port at the gNB and an antenna port at the UE. Within an environment, which can be indoors or outdoors, wherein a wireless communication system has been implemented, there can be environmental changes due to multi-path fading, interference, and physical changes within the environment. For example, dynamic environmental changes can be moving objects, moving people, moving UE, user device interaction, wind, rain, and other dynamic environmental changes, and slower changing environmental changes can be temperature gradient changes, equipment overheating, additional UE devices creating interference, and other environmental changes.

Due to the potential environment changes, a PL that meets a link quality threshold for a data message, may not be the best PL or may even be unusable for a subsequent data message. The PL quality parameter can be affected more when using frequency range one (FR1) due to the characteristics of the environment at these frequencies.

Increasing the number of parallel MIMO branches at the gNB or the UE can increase the number of PL received by the transceiver. Combining the received PLs can increase the performance of enhanced mobile broadband (eMBB) and ultra-reliable and low latency communication (URLLC). Increasing the number of MIMO branches can be an expensive solution that can increase power consumption and the size of the die. Another solution can be to switch between different physical antennas, which can be a cost-effective solution to increase the system performance, at an increase in size and cost, since additional antennas will have to be integrated into the device. The overall performance can be improved if the antennas at each MIMO branch can alter their respective radiation patterns (see FIG. A for a UE example and FIG. 1B for a gNB example).

The disclosure describes a per antenna (single element) radiation pattern control as specified within a PL. An antenna with a reconfigurable radiation pattern at each MIMO branch can receive different portions of the multi-path environment and thereby enable the potential to select the best available PL for a next time interval. The changing of the radiation patterns may or may not increase the gain of the antenna. The radiation pattern control can allow each MIMO branch to receive the multi-path transmission in a different way. The limit on the number of available radiation patterns is limited by the antenna capabilities at the gNB and UE, for example, there can be four, sixteen, thirty-two, or two hundred fifty-six available radiation patterns. A PL index (PLI) can be added as a parameter container to the UCI and DCI to track the characterization and monitoring of each available PL, including the utilized radiation pattern. The PLI can reference PLI configurations that can include configuration parameters that can be utilized by the transceiver, for example, antenna radiation pattern configurations. The selected PL used for sending a data message can be selected from the set of available PLs.

The control of the different antenna radiation patterns can be typically analog, whereby one radiation pattern can be active at any given time. Therefore, the PLs created by the different radiation patterns of each MIMO branch can be separately monitored to calculate the CSI parameters for each of the available PLs.

The MIMO branch at the gNB and the UE can receive a portion of the current multi-path environment through the antennas respectively connected to them and thereby receive a PL with a certain set of properties. Increasing the number of available PLs between the gNB and the UE can be used to take advantage of the multi-path environment to increase the through-put (MIMO) or reduce the performance impact of the multi-path environment (switch diversity). The MIMO throughput can use multiple parallel MIMO branches where each branch utilizes a different PL. The switch diversity can use one MIMO branch switched between multiple antennas, for example, two antennas.

For an uplink case example, the UE can have one antenna port and the gNB can have two antenna ports. In a conventional PL, the 1×2 uplink propagation channel has diversity order of two. By introducing two reconfigurable radiation patterns for the UE antenna port, the total diversity order can be increased to four. Combining the system performance enhancements from both MIMO and switch diversity can improve the system performance by increasing the number of monitored and usable PLs per antenna port.

In an alternate aspect, the PL can enable a new feature for enhanced multi-link diversity (EMLD). EMLD can monitor multiple PLs in the uplink and downlink directions. The best PLs at the time interval can be selected by the gNB and communicated to the UE so that each antenna port can utilize the specified PL. In an alternate aspect, the best PLs can be selected by the UE and communicated to the gNB. The PL can also be used for beam tracking and handover for frequency range two (FR2).

Traditional diversity can have one PL per MIMO branch and can create a multi-link environment of up to $(N_{gNB} * N_{UE})$ links, where N is the number of MIMO branches at the gNB and the UE. EMLD can create additional M (number of radiation patterns—equating to the number of PLs) links per MIMO branch and can generate additional available PLs, e.g., the diversity order. Toggling between M different non-correlated radiation patterns per MIMO branch (such as an antenna port) can increase the number of available PLs with a factor of M, without increasing the number of required MIMO branches or it can reduce the number of required MIMO branches by a factor of M. Table 1 demonstrates an example diversity order comparison between conventional MIMO diversity order and EMLD diversity order.

TABLE 1

Example conventional and EMLD diversity order comparison

| Total number of MIMO branches | Traditional diversity order | EMLD diversity order Number of radiation patterns per MIMO branch at the UE | | | |
|---|---|---|---|---|---|
| | | 2 | 3 | 4 | M |
| $(N_{gNB} + N_{UE})$ | (MIMO) | | | | |
| 2 (1 + 1) | 1 | 2 | 3 | 4 | $1 * (1^{N(UE)})$ |
| 3 (2 + 1) | 2 | 4 | 6 | 8 | $2 * (1^{N(UE)})$ |
| 4 (2 + 2) | 4 | 8 | 18 | 32 | $2 * (2^{N(UE)})$ |

TABLE 1-continued

Example conventional and EMLD diversity order comparison

| Total number of MIMO branches | Traditional diversity order | EMLD diversity order Number of radiation patterns per MIMO branch at the UE | | | |
|---|---|---|---|---|---|
| | | 2 | 3 | 4 | M |
| $(N_{gNB} + N_{UE})$ | (MIMO) | | | | |
| 6 (4 + 2) | 8 | 16 | 36 | 64 | $4 * (2^{N(UE)})$ |
| 8 (4 + 4) | 16 | 64 | 324 | 1024 | $4 * (4^{N(UE)})$ |
| $(N_{gNB} + N_{UE})$ | $(N_{gNB} * N^{UE})$ | $N_{gNB} * (2^{N(UE)})$ | $N_{gNB} * (3^{N(UE)})$ | $N_{gNB} * (4^{N(UE)})$ | $N_{gNB} * (M^{N(UE)})$ |

The number of potential PLs depends on the number of MIMO branches and the number of different radiation patterns of the antenna connected to each MIMO branch. The EMLD diversity order is equal to the number of PL iterations to include the potential combinations where a combined quality of the current MIMO channel (all antenna ports) is evaluated using the CSI. This can be the evaluation parameter when optimizing for throughput (such as eMBB) and can also be used for URLLC systems. The number of iterations can be reduced for URLLC systems if each of the MIMO branches are individually evaluated and the resulting monitoring data is sent to the gNB using an expanded CSI. Table 2 shows an example of the efficiency gains that can be realized when utilizing an expanded CSI.

TABLE 2

Example diversity order using expanded CSI

| MIMO branches | | Radiation patterns per MIMO branch | | Traditional diversity order | EMLD diversity order | # of iterations for URLLC with expanded CSI |
|---|---|---|---|---|---|---|
| gNB | UE | gNB | UE | (MIMO) | | |
| 1 | 1 | 1 | 64 | 1 | 64 | $64^1 = 64$ |
| 2 | 2 | 1 | 6 | 6 | 72 | $6^2 = 36$ |
| 4 | 2 | 1 | 4 | 8 | 64 | $4^2 = 8$ |
| 4 | 4 | 1 | 2 | 16 | 64 | $2^4 = 8$ |

A low number of iterations within one PL cycle interval, e.g., a cycle of monitoring the available PLs and updating the PL quality parameters for each PL, can decrease the latency, since the calculated properties for each PL entry in a PLI table can be updated more often. This approach can utilize more MIMO branches and more CSI signaling for a given number of PLs leading to a tradeoff between reliability, operation overhead, size, and cost. In addition, the PL cycle interval can be partially complete or controlled in a more intelligent way, by analyzing previously monitored PL quality parameters of the PL.

EMLD systems can lead to advantages such as increasing the number of available PLs through increasing the number of monitored PLs. Reliability can be increased since higher performing PLs can be used in place of poorer performing PLs. In addition, the number of transceiver devices can be reduced since the available transceivers can utilize multiple PLs which can lead to a reduction in power consumption, die size, and operating costs. In addition, the overall throughput can be increased since the best PL can be selected per MIMO branch. Sensitivity to unintentional interferences (such as weather changes, building materials, passing objects), intentional interferences (such as jamming), and signal blocking can be reduced since multiple PLs can be monitored and the best fit PL can be selected.

3GPP Rel. 15 does not currently include a means to characterize, monitor, and select used and unused, and available, PLs. 3GPP Rel. 15 uses CSI-RS in downlink and SRS in uplink to support CSI calculated parameters and feedback. The control mechanism described in 3GPP Rel. 15 for CSI reporting can be updated to support the methods described herein.

The control mechanism to support EMLD may require changes to one or more of the DCI and UCI messages, such as adding a new container to hold the new PL parameters, where a PLI can be added to inform the gNB which PL was used at the UE in the downlink to calculate the parameters included in the current UCI message. In addition, one or two PLIs can be added, as a new container, to the DCI to inform the UE, which PL to use for subsequent downlink data messages (physical downlink shared channel—PDSCH) and which PL to use in subsequent uplink data messages (physical uplink shared channel—PUSCH). The PL selected can also depend on the type of communication system, for example, a frequency division duplex (FDD) or time division duplex (TDD) system. The decision of which PL to use at the UE can be controlled by the gNB. Alternatively, the PL can be controlled at the UE, with the UE informing the gNB of the utilized PL.

Alternatively, the PL can be implicitly indicated with other NR existing messages. In one aspect, the PLI of the PL can be associated with SRS and SRI. In this aspect, the SRI can be used by the gNB to select the best MIMO branch at the UE for PUSCH. The PLI can be used as an index at each MIMO branch or as a common index for the potential antenna pattern combinations.

For implementing the disclosure using the UCI, one option for updating 3GPP Rel. 15 can be to add three additional PUCCH formats to the currently specified formats. One additional format can be [CSI+PLI], a second additional format can be [HARQ ACK/NACK+CSI+PLI]. A third additional format can be [HARQ ACK/NACK+SR+CSI+PLI]. A second option can be to add a new container to the CSI, such as adding a container labeled PLI. For example, Listing 1 is a pseudo-code showing the CSI with the added PLI container.

Listing 1: Example CSI-reportConfig pseudo-code sequence with the additional PLI container

```
CSI-ReportConfig ::= SEQUENCE {
    reportConfigId                      CSI-ReportConfigId,
    carrier                             ServCellIndex OPTIONAL,
    resourcesForChannelMeasurement      CSI-ResourceConfigId,
    csi-IM-ResourcesForInterference     CSI-ResourceConfigId OPTIONAL,
    nzp-CSI-RS-ResourcesForInterference    CSI-ResourceConfigId OPTIONAL,
    PLI                                 BIT STRING(SIZE(x)),
    .
    .
    .
}
```

Implementing the disclosure using the DCI can utilize one or more options as well. One option for updating 3GPP Rel. 15 can be to add a new DCI format for informing the UE which PLI to be used. The new DCI format can include a new container for the PLI for the PDSCH and PUSCH as demonstrated in Table 3.

TABLE 3

Example new DCI format to support PLI selections

| Field (item) | Bits | Reference |
| --- | --- | --- |
| Identifier for DCI formats | 1 | |
| PLI for PDSCH | X (sufficient bits to describe the PLI) | PLI for downlink data messages |
| PLI for PUSCH | X (sufficient bits to describe the PLI) | PLI for uplink data messages |

A second option for updating the 3GPP Rel. 15 can be to add one or two new containers to the existing DCI formats 0_0, 0_1, 1_0, and 1_1. Table 4 is an example of a partial DCI format 0_1 showing the addition of the PLI downlink and uplink containers.

TABLE 4

Example partial DCI format 0_1 table with PLI containers

| Field (Item) | Bits | Reference |
|---|---|---|
| Identifier for DCI formats | 1 | |
| Carrier Indicator | 0 or 3 | |
| UL/SUL Indicator | 0, 1 | 0 - bit for UE not configured with SUL in the cell<br>1 - bit for UEs configured with SUL in the cell |
| Bandwidth part indicator | 0, 1, 2 | Determined by BandwithPart-Config in higher layer message and 38.212 - Table 7.3.1.1.2-1 |
| Frequency domain resource assignment | Variable | Variable with Resource Allocation Type |
| Time domain resource assignment | 4 | Carries the row index of the items in pusch allocationList in RRC<br>Number of Bit Length is determined by log(I, 2), where I is the number of elements in pusch allocationList in RRC |
| Frequency Hopping Flag | 0, 1 | |
| Modulation and coding scheme | 5 | 38.214-6.1.4 (See this table) |
| New data indicator | 1 | |
| Redundancy version | 2 | 0, 1, 2, 3 |
| HARQ process number | 4 | |
| 1st Downlink assignment index | 1, 2 | |
| 2nd Downlink assignment index | 0, 2 | |
| TPC command for scheduled PUSCH | 2 | |
| SRS resource indicator | Variable | Determined by RRC Parameter SRS-SetUse |
| Precoding information and number of layers (TPMI) | 0, 2, 3, 4, 5, 6 | Determined by ulTxConfig, Number of Antenna ports, PUSCH-tp, ULmaxRank |
| Antenna ports | 2, 3, 4, 5 | Determined by PUSCH-tp, DL-DMRS-config-type, DL-DMRS-config-max-len, Rank |
| SRS request | 2 | Table 7.3.1.1.2-24 |
| CSI request | 0, 1, 2, 3, 4, 5, 6 | Determined by ReportTriggerSize in RRC message |
| CBG transmission information | 0, 2, 4, 6, 8 | Determined by maxCodeBlockGroupPerTransportblock in RRC message |
| PTRS - DMRS Association | 0, 2 | Determined by UL-PTRS-present, PUSCH-tp in RRC Message |
| Beta_offsetr Indicator | 0, 2 | 0 - if uci-on-PUSCH.dynamic = Not Configured<br>2 - otherwise, see Table 7.3.1.1.2-27 |
| DMRS Sequence Initialization | 0, 1 | 0 - if PUSCH-tp = Disabled<br>1 - if PUSCH-tp = Enabled |
| UE-SCH Indicator | 1 | 0 - UL-SCH shall not be transmitted on the PUSCH<br>1 - UL-SCH shall be transmitted on the PUSCH |
| PLI for DL | X | PLI for downlink |
| PLI for UL | X | PLI for uplink |

The disclosure outlines method steps that are melded with existing 3GPP Rel.15 steps using the presented structures as described herein. In a starting step of the method, the UE can receive a CSI-RS from the gNB using a PL, such as a default PLI-1. The UE can measure the receiving quality with the PL for its UCI message. In a subsequent step, the UE reports to gNB the PLI and a PL quality parameter in a UCI. The gNB can store the PL quality parameter associated with the PLI in a storage area, such as a PLI table. If the PLI already has an entry in the storage area, it is overwritten with the newly received PL quality parameter. When SRS is utilized, the gNB can receive the SRS from the UE utilizing the same PLI as in the first step. The gNB can then calculate the other parameters and store the PLI with the PL quality parameter in the storage area.

The gNB can select the best fit PL from the set of available PLs stored in the storage area. The gNB can communicate the selected PL, such as through the DCI or high layer signaling, to the UE so the UE can utilize the appropriate PL. At any point in these steps, if a PDSCH or PUSCH is scheduled to be transmitted by the UE or the gNB, the respective transmitter will utilize the currently selected PL.

These steps can be repeated as many times as necessary to monitor various PLs. To avoid utilizing an excess of system resources in monitoring the various PLs, a PL cycle interval can be used where the PLs can be checked and monitored at a periodic interval. For example, the PL cycle interval can occur at a every time interval, such as one second, after a number of communication frames have been sent, at a request of the UE or gNB, and a time when the currently selected PL results in a PL quality parameter that falls below a link quality threshold. Other PL cycle intervals can be utilized as well.

Turning now to the figures, FIG. 1A is an illustration of a diagram of an example UE 100 with multiple antennas. UE 100 can be various devices capable of communicating with a gNB. For example, UE 100 can be a mobile device, such as a smartphone, mobile phone, tablet, laptop, personal data assistance (PDA), and other types of mobile devices. In addition, UE 100 can be, but not limited to, fixed or semi-fixed hardware, such as a server, an integrated access backhaul system, an industrial internet of things (IIoT), an industrial device or equipment, an industrial automation system, robotic equipment, a router, a network controller, a vehicle, a ship, an airplane, a train, a transportation structure, and other types of devices that can act as UE.

UE 100 can have a container 105 to hold the communication circuitry and communication antennas. Container 105 is shown, in this example, as a smartphone with four 5G capable antennas. The four antennas are capable of transmitting and receiving communications using a variety of PLs, e.g., radiation patterns, at each MIMO branch. Radiation pattern 110, radiation pattern 112, radiation pattern 114, and radiation pattern 116 are shown as a combined radiation pattern where each radiation pattern 110, 112, 114, and 116 are three separate radiation patterns overlaid each other. The methods described herein can allow the UE and gNB to select a radiation pattern to be used for each of the four antennas of container 105.

Figure 1B:
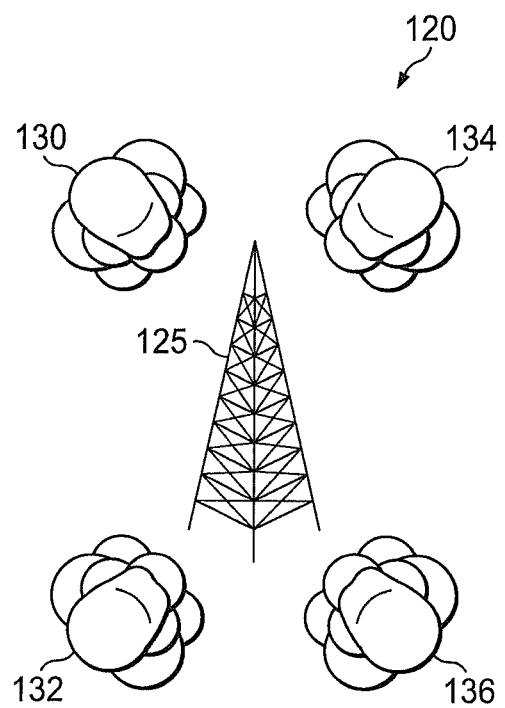
FIG. 1B is an illustration of a diagram of an example fifth-generation (5G) base station (gNB) with multiple antennas.

FIG. 1B is an illustration of a diagram of an example gNB 120 with multiple antennas. gNB 120 can be various types of broadband base stations supporting the 3GPP Rel.15 standard. gNB 120 can have an antenna set 125, including one or more MIMO branches, and communication circuitry. Antenna set 125 is shown, in this example, as a tower with four 5G capable antennas.

The four antennas are capable of transmitting and receiving communications using a variety of radiation patterns. Radiation pattern 130, radiation pattern 132, radiation pattern 134, and radiation pattern 136 are shown as a combined radiation pattern where each radiation pattern 130, 132, 134, and 136 are three separate radiation patterns overlaid each other. The methods described herein can allow the UE and gNB to select a radiation pattern to be used for each of the four antennas of antenna set 125.

Figure 1C:
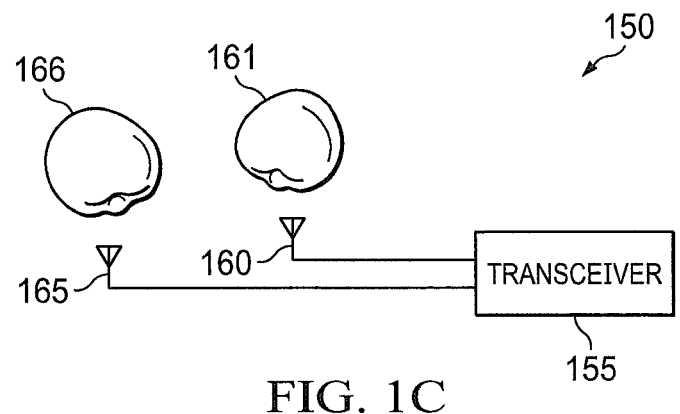
FIG. 1C is an illustration of a diagram of an example multiple in multiple out (MIMO) antenna system using a single radiation pattern for each antenna.

FIG. 1C is an illustration of a diagram of an example MIMO antenna system 150 using a single radiation pattern for each antenna. MIMO antenna system 150 demonstrates a traditional diversity order MIMO where one PL between an antenna port at the gNB and an antenna port at the UE is being monitored. MIMO antenna system 150 has a transceiver 155 with two MIMO branches, MIMO 160 and MIMO 165. MIMO 160 is using a PL radiation pattern 161 and MIMO 165 is using a PL radiation pattern 166. Transceiver 155 can be a UE or a gNB.

Figure 1D:
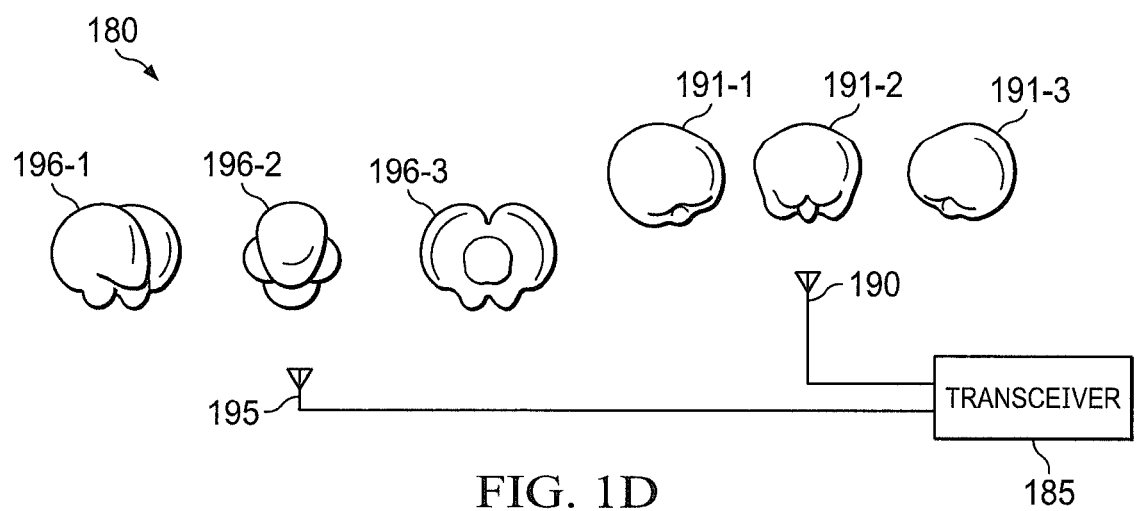
FIG. 1D is an illustration of a diagram of an example MIMO antenna system using multiple potential radiation patterns for each antenna.

FIG. 1D is an illustration of a diagram of an example MIMO antenna system 180 using multiple potential radiation patterns for each antenna. MIMO antenna system 180 demonstrates an implementation of the disclosure where there can be more than one PL being monitored at each MIMO branch. MIMO antenna system 180 includes a transceiver 185 that can be a UE or a gNB. Communicatively coupled to transceiver 185 are MIMO branch 190 and MIMO branch 195.

MIMO branch 190 has three radiation patterns being monitored through the PL process, radiation pattern 191-1, radiation pattern 191-2, and radiation pattern 191-3, collectively referred to as radiation patterns 191. There can be fewer or additional radiation patterns being monitored at MIMO branch 190. MIMO branch 195 has three radiation patterns being monitored through the PL process, radiation pattern 196-1, radiation pattern 196-2, and radiation pattern 196-3, collectively referred to as radiation patterns 196. There can be fewer or additional radiation patterns being monitored at MIMO branch 195, and the number of radiation patterns being monitored can be different than the number at MIMO branch 190. In addition, there can be additional MIMO branches coupled to transceiver 185, where each MIMO branch can utilize the same, similar, or different set of radiation patterns.

Figure 2A:
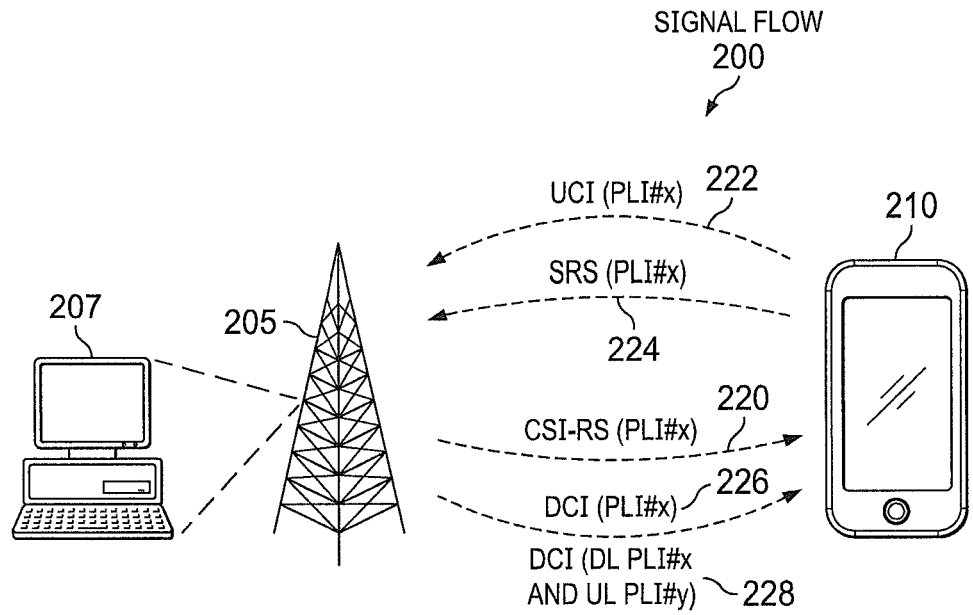
FIG. 2A is an illustration of a system diagram of an example signal flow using a designated propagation link (PL) index (PLI) configuration at a second transceiver.

FIG. 2A is an illustration of a system diagram of an example signal flow 200 using a designated PLI configuration at a second transceiver. Signal flow 200 is implemented using a first transceiver 205 and a second transceiver 210. First transceiver 205 includes a PLI analyzer 207 that is capable to analyze PL quality parameters, store the PL quality parameters, and select a best fit PLI configuration for use by the second transceiver 210. First transceiver 205 can be a gNB or a UE, with a gNB shown for demonstration purposes in signal flow 200. Second transceiver 210 is the other of the gNB and UE, with a UE shown for demonstration purposes in signal flow 200.

Signal flow 200 starts with a CSI-RS 220, or other reference signals transmitted from first transceiver 205, which is then received at second transceiver 210 utilizing a default first PLI configuration. Second transceiver 210 can analyze, e.g., calculate, the downlink PL quality parameters (CSI for downlink) utilizing the current PLI configuration at second transceiver 210. A control signal including the used PLI, such as UCI signal 222, can be used by second transceiver 210 to transmit the PL quality parameters to first transceiver 205. PLI analyzer 207 can record the received PL quality parameters associated with the PLI received in the UCI signal 222. In some aspects, first transceiver 205 can analyze, e.g., calculate, the uplink PL quality parameters from a reference signal, such as SRS 224, received from second transceiver 210. The uplink PL quality parameters (CSI for uplink) can be stored by PLI analyzer 207 for the same PLI received in UCI signal 222. The second transceiver will change the PLI configuration, e.g., the radiation pattern for the next scheduled CSI-RS 220.

PLI analyzer 207 can select a first best fit PLI configuration from the recorded set of system link quality parameters using various factors, such as a link quality threshold and a PL efficiency threshold, where the PL efficiency can be satisfied by minimizing processing time, minimizing storage space, minimizing cost, minimizing time to complete a PL cycle interval, and other factors to improve the processing at the UE and gNB. The first best fit PLI configuration can be utilized by second transceiver 210, such as to configure its one or more antennas. In some aspects, such as in TDD systems, PLI analyzer 207 can select a second, e.g., uplink, best fit PLI configuration, such as when the first best fit PLI configuration is selected for configuration by second transceiver 210 for downlink communications and the second best fit PLI configuration is selected for configuration by second transceiver 210 for uplink communications. The second best fit PLI configuration can be the same as the first best fit PLI configuration.

In FDD systems, DCI signal 226 can be used to transmit the best fit PLI configuration to second transceiver 210. Second transceiver 210 can configure its one or more antennas for subsequent downlink and uplink control signals and data messages, e.g., communications. In TDD systems, DCI signal 228 can be utilized which includes a first best fit PLI configuration to be used for downlink communications and a second best fit PLI configuration to be used for uplink communications. In this aspect, second transceiver 210 can configure its one or more antennas using the first best fit PLI configuration for subsequent downlink communications, and the second best fit PLI configuration for subsequent uplink communications.

In some aspects, reference signaling, such as a SRS signal 224, can be sent by second transceiver 210 at various points in signal flow 200, for example, after UCI signal 222 and before the next scheduled CSI-RS 220. SRS signal 224 is scheduled by the first transceiver 205 and can therefore be associated with the same PLI configuration as received in UCI signal 222, since second transceiver 210 will keep the PLI configuration until the next scheduled CSI-RS 220, as long as SRS 224 is scheduled before the next CSI-RS 220. First transceiver 205 can analyze received SRS signal 224 and update the PL quality parameters for the utilized PLI configuration.

Figure 2B:
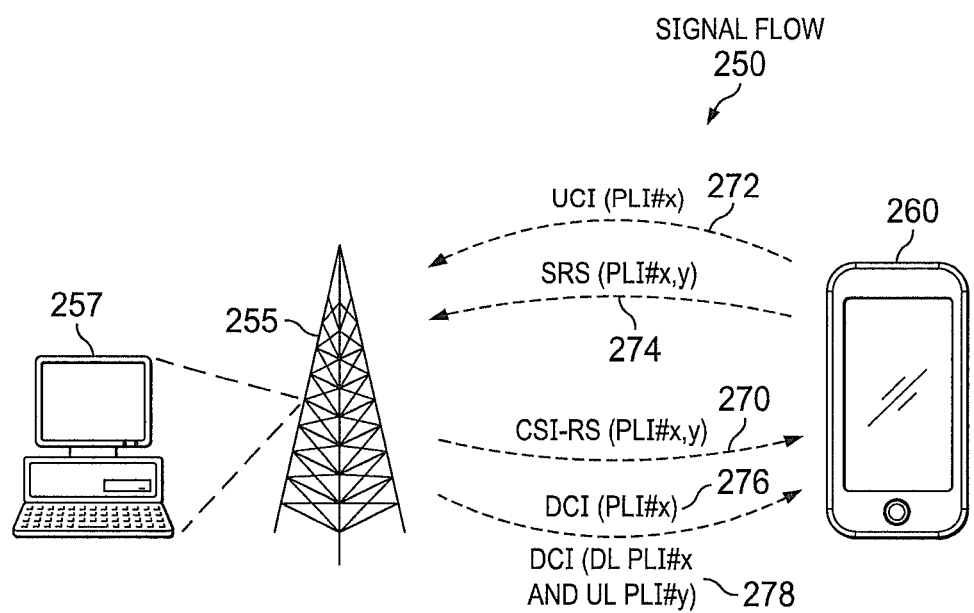
FIG. 2B is an illustration of a system diagram of an example signal flow using designated PLI configurations at a first transceiver and a second transceiver.

FIG. 2B is an illustration of a system diagram of an example signal flow 250 using designated PLI configurations at a first transceiver and at a second transceiver, demonstrating example message flows, and is similar to FIG. 2A. Signal flow 250 is implemented using a first transceiver 255 and a second transceiver 260. First transceiver 255 includes a PLI analyzer 257 that is capable to analyze PL quality parameters, store the PL quality parameters, and select one or more best fit PLIs for use by first transceiver 255 and one or more best fit PLIs for use by second transceiver 260. First transceiver 255 can be a gNB or a UE, with a gNB shown for demonstration purposes in signal flow 250. Second transceiver 260 is the other of the gNB and UE, with a UE shown for demonstration purposes in signal flow 250.

Signal flow 250 starts with first transceiver 255 configuring itself using a first default PLI configuration, such as a first best fit PLI configuration, for downlink communications. The determination of the first best fit PLI configuration can utilize the link quality threshold, PL efficiency threshold, or selected as the next available PLI from the set of system link quality parameters such as when the various available PLs are being evaluated. First transceiver 255 can transmit a CSI-RS signal 270, which is received at second transceiver 260 utilizing a second default PLI configuration, from an available pool of PLs, or as a best fit PLI configuration utilizing the currently recorded PLI quality parameters in the set of system link quality parameters.

Second transceiver 260 can analyze, e.g., calculate, the downlink PL quality parameters (CSI) utilizing the current PLI configuration at second transceiver 260. A control signal, such as UCI signal 272, including the used PLI configuration, can be used by second transceiver 260 to transmit the PL quality parameters to first transceiver 255. PLI analyzer 257 can store the received PL quality parameters associated with the used first PLI configured at the first transceiver and the used second PLI configured at the second transceiver, received via UCI signal 272. In some aspects, first transceiver 255 can analyze the uplink PL quality parameters from a received reference signal, such as a SRS signal 274, from second transceiver 260. The uplink PL quality parameters can be stored by PLI analyzer 257 for the configured first and second PLI.

PLI analyzer 257 can select one or two best fit PLIs from the stored set of system link quality parameters using various factors, such as a link quality threshold and a PL efficiency threshold. The first best fit PLI configuration can be configured by second transceiver 260 and the second best fit PLI configuration can be configured by first transceiver 255, such as to configure one or more antennas. In some aspects, such as in TDD systems, PLI analyzer 257 can select a third and fourth best fit PLI configuration, such as when the first best fit PLI configuration is selected for use by second transceiver 260 for downlink communications, the second best fit PLI configuration is selected for use by first transceiver 255 for downlink communications, the third best fit PLI configuration is selected for use by second transceiver 260 for uplink communications, and the fourth best fit PLI configuration is selected for use by first transceiver 255 for uplink communications. For example, first transceiver 255 can configure its antennas to use the second best fit PLI configuration for downlink signals and the fourth best fit PLI configuration for uplink signals, and second transceiver 260 can configure its antennas to use the first best fit PLI configuration for downlink signals and the third best fit PLI configuration for uplink signals.

In FDD systems, DCI signal 276 can be used to transmit the third best fit PLI configuration to second transceiver 260. Second transceiver 260 can configure its one or more antennas for subsequent downlink and uplink communications. In TDD systems, DCI signal 278 can be utilized which includes the first best fit PLI configuration to be used for downlink communications and the third best fit PLI configuration to be used for uplink communications. In this aspect, second transceiver 260 can configure its one or more antennas using the first best fit PLI configuration for ensuing downlink communications, and the third best fit PLI configuration for ensuing uplink communications.

In some aspects, reference signaling, such as SRS signal 274, can be sent by second transceiver 260 at various points in signal flow 250, for example, after UCI signal 272 and before the next scheduled CSI-RS 270. SRS signal 274 is scheduled by first transceiver 255 and can therefore be associated with the same second PLI as received in UCI signal 272, since the UE will keep the second PLI configuration until the next scheduled CSI-RS 270, as long as SRS signal 274 is scheduled before the next CSI-RS 270. First transceiver 255 can analyze received SRS signal 274 and update the PL quality parameters for the utilized PLI configuration.

Figure 3A:
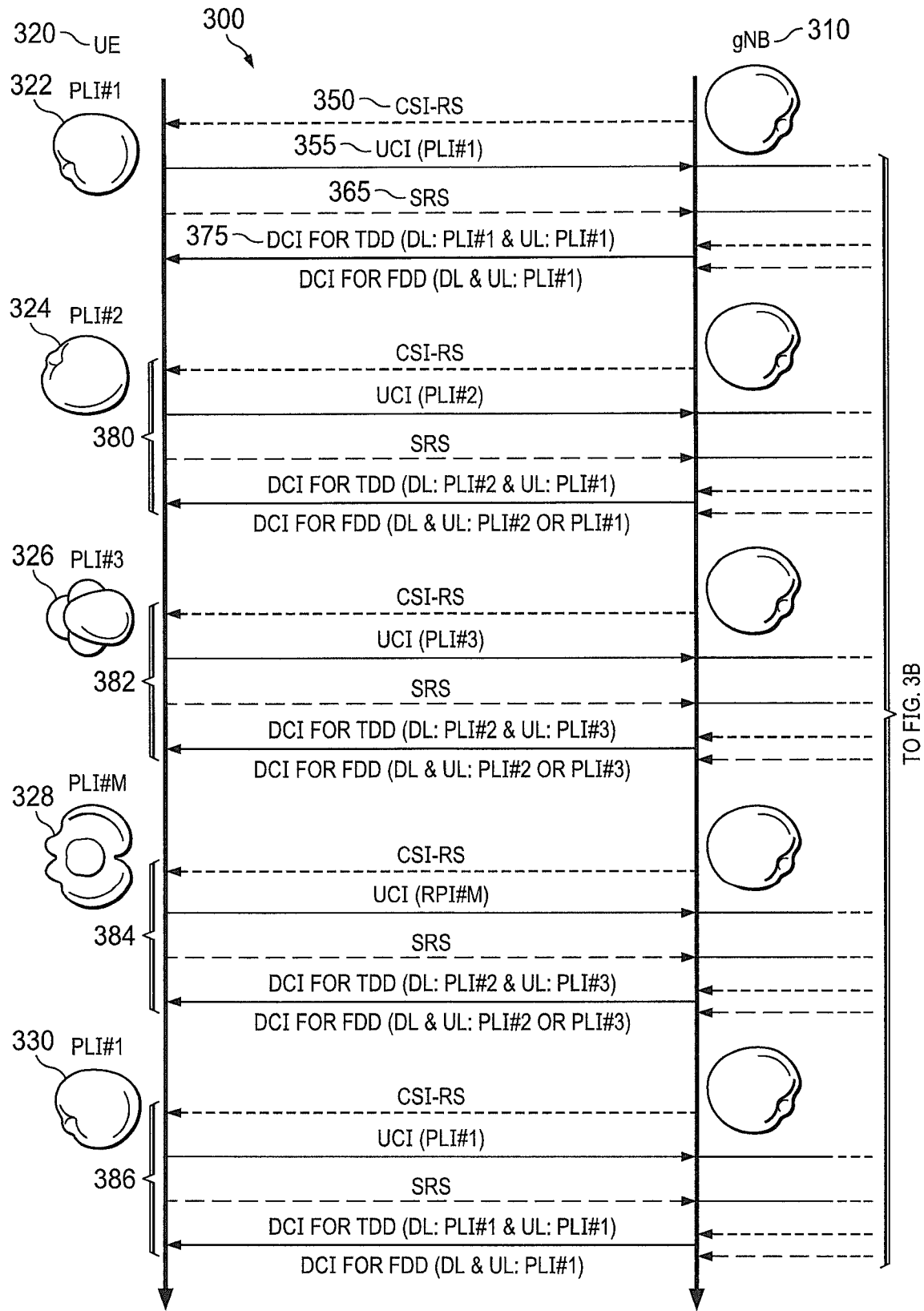
FIG. 3A is an illustration of a flow diagram of an example method for selecting the best available PL for downlink and uplink propagations when using PLI at the second transceiver.
Figure 3B:
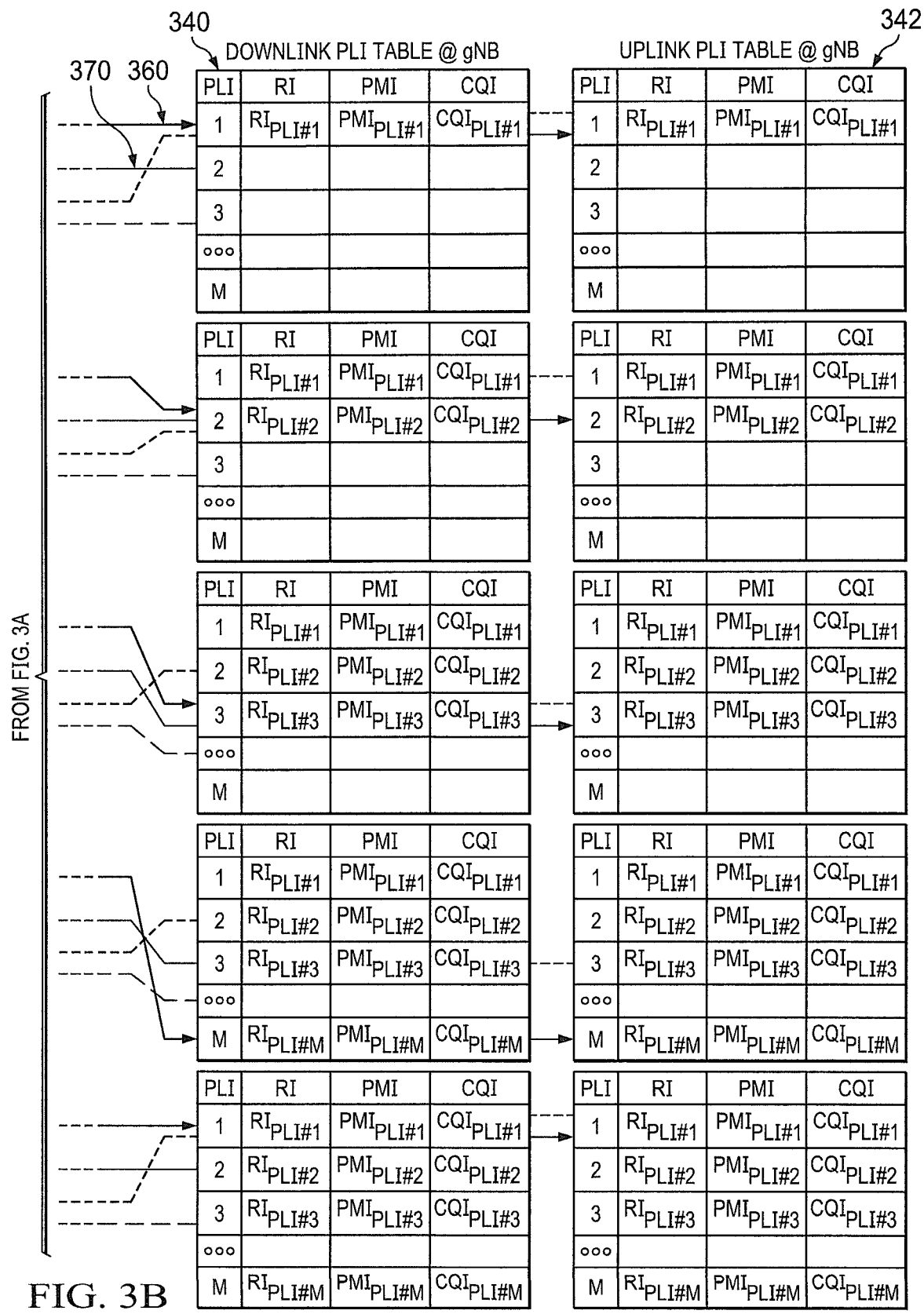
FIG. 3B is an illustration of a table of an example PL index storage.

FIG. 3A is an illustration of a flow diagram of an example method 300 for selecting the best available PL for downlink and uplink propagations when using PLI configuration at the second transceiver. FIG. 3B is a continuation of FIG. 3A demonstrating PLI tables. Method 300 is demonstrating an EMLD control procedure for downlink and uplink monitoring. Method 300 is shown as a cross functional flow diagram between a gNB 310 and a UE 320 where some of the control signals are shown being transmitted between the two transceivers. UE 320 is shown with several radiation patterns whose monitoring are being tracked by PLIs. Monitoring for radiation pattern 322 is being tracked by PLI-1, monitoring for radiation pattern 324 is being tracked by PLI-2, and monitoring for radiation pattern 326 is being tracked by PLI-3. There can be additional radiation patterns being monitored, shown by radiation pattern 328 being tracked by PLI-M.

After the initial set of available radiation patterns, as tracked by the set of available PLs, have been monitored, the process can work through the set of available PLs again as shown by radiation pattern 330 replacing the tracking values recorded for PLI-1. The set of available PLs can be the set including all potential PLs that the UE and gNB are capable of transceiving. However, the cost in terms of processing time can exceed a reasonable threshold. Therefore, the set of available PLs can be culled or limited by selection factors, such as selecting those PLs that are likely to result in satisfying the link quality threshold taking into account the type of gNB and UE hardware being used. For example, certain UE may not work well with certain radiation patterns. In addition, the process can limit PLs from the set of available PLs if certain radiation patterns have consistently resulted in PL quality parameters that failed to satisfy the link quality threshold. For example, a steel-reinforced concrete wall may create interference that limits the effectiveness of certain radiation parameters. Other factors can be utilized as well to cull the set of available PL.

Method 300 starts at gNB 310 where a CSI-RS 350 is transmitted to UE 320. UE 320 receives CSI-RS 350 using radiation pattern 322, as tracked by PLI-1, and calculates communication parameters for a UCI 355. The UE 320 transmits UCI 355 where the PL quality parameter and the associated PLI is included to inform gNB 310 which radiation pattern was used to calculate the CSI communication parameters.

At step 360 gNB 310 stores the received UCI 355 parameters in a downlink storage area 340. For example, the parameters that can be stored are a PLI table, a RI, a PMI, a CQI, and other relevant parameters. Downlink storage area 340, as demonstrated, can represent the PLI and associated PL quality parameters in a table format. Other storage techniques can also be utilized while maintaining the PLI to PL quality parameter relationship, such as a file, a memory link relationship, and other storage paradigms. Additional PLI entries can be stored in downlink storage area 340 forming a set of system link quality parameters. gNB 310 can analyze the entries in downlink storage area 340 and select the best fit PLI configuration for future downlink communications.

UE 320 can transmit a SRS 365 to gNB 310, which is transmitted using the same PLI configuration the UE 320 used for receiving the previously transmitted CSI-RS 350 from gNB 310. In an alternative aspect, the PLI can be directly added to SRS 365, similar to how the PLI is added to a DCI or UCI. At step 370, gNB 310 can calculate the communication parameters for future UCI from SRS 365. Similar to downlink storage area 340, there can be an uplink storage area 342 to store the uplink PL quality parameters and associated PLI. Downlink storage area 340 and uplink storage area 342 can be the same storage area with appropriate adjustments to the indexing of the PL quality parameters to track both an uplink and downlink direction. Collectively, the downlink storage area and the uplink storage area form the set of system link quality parameters from which the best fit PLI configuration can be selected. gNB 310 can select the best fit PLI configuration for subsequent PDSCH and PUSCH.

gNB 310 can prepare a DCI 375 with the specified communication parameters associated with the selected PLI for downlink and uplink. DCI 375 can be prepared for TDD or FDD communication types, where TDD can typically support varying PLs for the PDSCH and PUSCH, and the FDD can typically support using the same PL for the PDSCH and PUSCH. The UE 320 can then utilize the specified PL for receiving and transmitting data messages.

The step for CSI-RS 350, the step for UCI 355, step 360, the step for SRS 365, step 370, and the step for DCI 375 can be repeated for each of the PLs in the set of available PLs as shown in the steps bracketed by step set 380 for PLI-2, step set 382 for PLI-3, and step set 384 for PLI-M. These steps collectively form one PL cycle interval, where each PL in the set of available PLs are monitored and the results stored in downlink storage area 340 and uplink storage area 342. When the next PL cycle interval begins, the process can continue with step set 386 and continue likewise for the remaining PLs in the set of available PLs, where the newer PL quality parameters can override the older PL quality parameters for the specified PLI.

During this process, or after completion, if a PUSCH or PDSCH is to be transmitted, the transceiver sending the data message will use the then current selected PLI configuration appropriate for the transceiver. gNB 310 can have a PLI analyzer that can receive the PL quality parameters and the PLI configuration, and maintain downlink storage area 340 and uplink storage area 342. PLI analyzer can be electronic circuitry or application code executing at or proximate gNB 310. The application code can be incorporated into other modules, functions, libraries, and other application structures and formats.

The PLI analyzer can also select the best fit PLI configuration from the set of system link quality parameters. The best fit can be the PLI configuration that results in the best system quality in terms of signaling and data throughput, or the best fit can be the PLI configuration that satisfies a minimum link quality threshold and minimizes system processing time and costs. When a minimum link quality threshold is satisfied, the process can utilize other factors in selecting the best fit PLI configuration. If the minimum link quality threshold is not satisfied, then the process can select the best quality PLI configuration.

An alternative aspect can have the process start at UE 320, where the downlink storage area 340 and uplink storage area 342 are located proximate UE 320 rather than gNB 310. In this aspect, UE 320 can inform gNB 310 on which PLI configuration to utilize for downlink and uplink messaging.

Figure 3C:
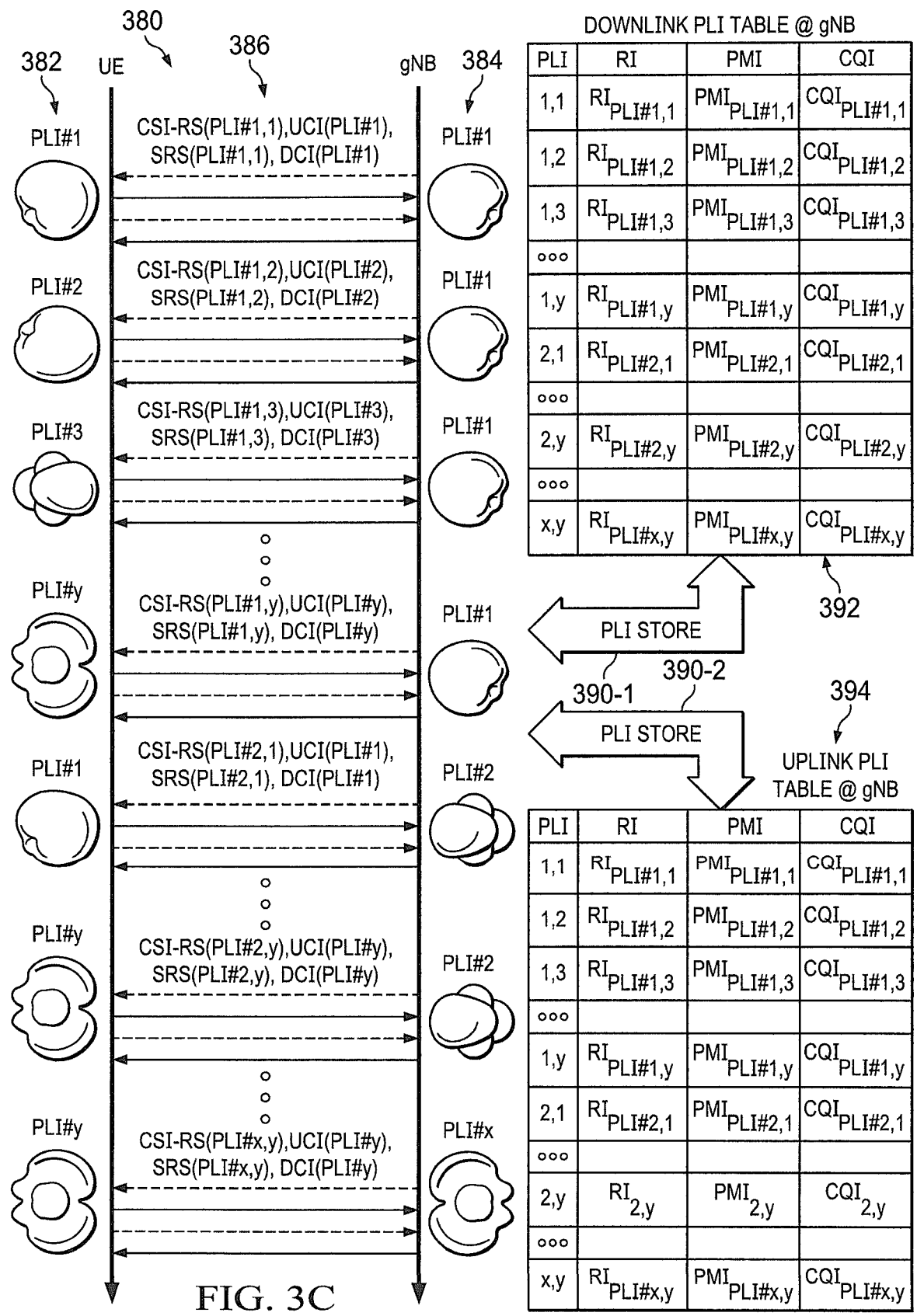
FIG. 3C is an illustration of a flow diagram and table of an example process flow for selecting the best available PL for downlink and uplink propagations when using PLI at the first transceiver and the second transceiver.

FIG. 3C is an illustration of a flow diagram and table of an example process flow 380 for selecting the best available PL for downlink and uplink propagations when using PLI configuration at the first transceiver and second transceiver. Process flow 380 is similar to method 300 of FIGS. 3A and 3B. Process flow 380 includes a first transceiver 384, such as a gNB, a second transceiver 382, such as a UE, and a PLI analyzer. PLI analyzer, can be included as part of first transceiver 384, located separately and proximate to first transceiver 384, located a distance from first transceiver 384, and located proximate second transceiver 382. PLI analyzer can include a downlink PLI storage 392, e.g., a table, database, file, and other storage mediums, and an uplink PLI storage 394, e.g., a table, database, file, and other storage mediums.

First transceiver 384 is shown using three different PLIs, PLI 1, PLI 2, and PLI x. These PLIs can be used for downlink communications, uplink communications, or a combination thereof. Second transceiver 382 is shown using four different PLIs, PLI 1, PLI 2, PLI 3, and PLI y. These PLIs can be used for downlink communications, uplink communications, or a combination thereof. The PLI x and PLI y indicate that there can be fewer or additional PLIs associated to the set of potential PLs.

Control and reference signals 386 provide a summary of the potential control and reference signals that can be transmitted between first transceiver 384 and second transceiver 382, such as CSI-RS, UCI, SRS, and DCI control/reference signals. Each of control signals 386 include one or more PLIs, and for certain control signals, include PL quality parameters. The PLIs included with control signals 386 correspond to the PLIs utilized at first transceiver 384 and second transceiver 382.

PLI store 390-1 and PLI store 390-2, collectively PLI stores 390, are mechanisms for storing and recording received PL quality parameters for an associated PLI or PLIs, as well as selecting and determining best fit PLI configuration for the downlink and uplink communications at each of first transceiver 384 and second transceiver 382. The process for PLI stores 390 can be encapsulated and performed by a PLI analyzer. PLI store 390-1 can be utilized to store and select PLI and associated PL quality parameters in downlink PLI store 392 using two indexes to correlate the respective PLIs used by first transceiver 384 and second transceiver 382 for downlink communications. PLI store 390-2 can be utilized to store and select PLI and associated PL quality parameters in uplink PLI store 394 using two indexes to correlate the respective PLIs used by first transceiver 384 and second transceiver 382 for uplink communications. In some aspects, PLI store 390-1 and PLI store 390-2 can be the same mechanism or process.

Figure 4:
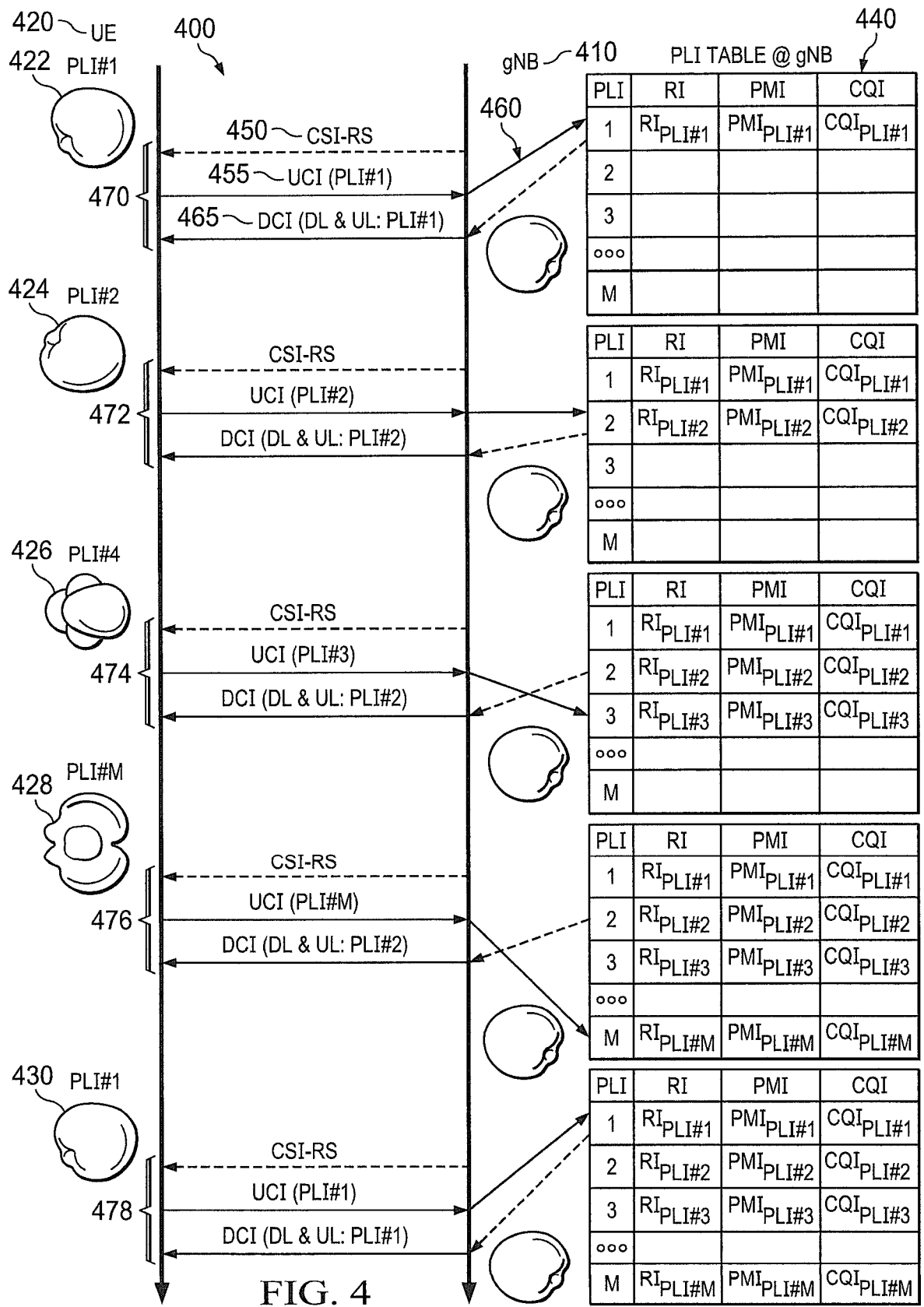
FIG. 4 is an illustration of a flow diagram of an example method selecting the best available PL when not using a sounding reference signal (SRS)

FIG. 4 is an illustration of a flow diagram of an example method 400 selecting the best available PL when not using a SRS. Method 400 is demonstrating an EMLD control procedure for a downlink alone monitoring cycle. Method 400 is shown as a cross functional flow diagram, similar to method 300 of FIG. 3, between a gNB 410 and a UE 420 where some of the control signals are shown being transmitted between the two transceivers. UE 420 is shown with several radiation patterns whose monitoring are being tracked by PLIs. Monitoring for radiation pattern 422 is being tracked by PLI-1, monitoring for radiation pattern 424 is being tracked by PLI-2, and monitoring for radiation pattern 426 is being tracked by PLI-3. There can be additional radiation patterns being monitored, shown by radiation pattern 428 being tracked by PLI-M.

After the initial set of available radiation patterns, as tracked by the set of available PLs, have been monitored, the process can work through the set of available PLs again as shown by radiation pattern 430 replacing the tracking values recorded for PLI-1. The set of available PLs is defined similarly as for FIG. 3.

Method 400 starts at gNB 410 where a CSI-RS 450 is transmitted to UE 420. UE 420 receives CSI-RS 450 using radiation pattern 422, as tracked by PLI-1, and calculates the communication parameters for a UCI 455. UE 420 transmits UCI 455 where the PL quality parameter and the associated PLI is included to inform gNB 410 which radiation pattern was used in CSI measurement to calculate the other communication parameters.

At step 460, gNB 410 stores the received UCI 455 parameters in a PLI storage area 440, such as a PLI table where the RI, PMI, and CQI are stored. PLI storage area 440, as demonstrated, can represent the PLI and associated PL quality parameters in a table format, e.g., a set of system link quality parameters. Other storage techniques can also be utilized while maintaining the PLI to PL quality parameter relationship, such as a file, a memory link, linked lists, and other storage paradigms. Additional PLI entries can be stored in PLI storage area 440 forming a set of system link quality parameters. gNB 410 can analyze the entries in PLI storage area 440 and select the best fit PLI for future downlink and uplink communications. gNB 410 can select the best fit PLI configuration for future PDSCH and PUSCH.

gNB 410 can prepare a DCI 465 with the specified communication parameters associated with the selected PLI configuration for both downlink and uplink. DCI 465 can be prepared for TDD or FDD communication types. Method 400 can be used for TDD if the channels are considered reciprocal. Method 400 can be used for FDD if the duplex spacing satisfies a duplex spacing threshold (typically a maximum spacing value). UE 420 can then utilize the specified PL for receiving and transmitting PDSCH and PUSCH.

The step for CSI-RS 450, the step for UCI 455, step 460, and the step for DCI 465 can be repeated for each of the PLs in the set of available PLs as shown in the steps bracketed by step set 470 for PLI-1, step set 472 for PLI-2, step set 474 for PLI-3, and step set 476 for PL-M. These steps collectively form one PL cycle interval, where each PL in the set of available PLs is monitored and the results stored in PLI storage area 440. When the next PL cycle interval begins, the process can continue with step set 478 and continue likewise for the remaining PLs in the set of available PLs, where the newer PL quality parameters can override the older PL quality parameters for the specified PLI.

During this process, or after completion, if a data message is to be transmitted, the transceiver sending the data message can use the then currently selected PLI appropriate for the transceiver. The gNB 410 can have a PLI analyzer operating similarly to the PLI analyzer of gNB 310. Similar to method 300, an alternative aspect can have the process start at UE 420, where PLI storage area 440 is located proximate UE 420 rather than gNB 410.

Figure 5:
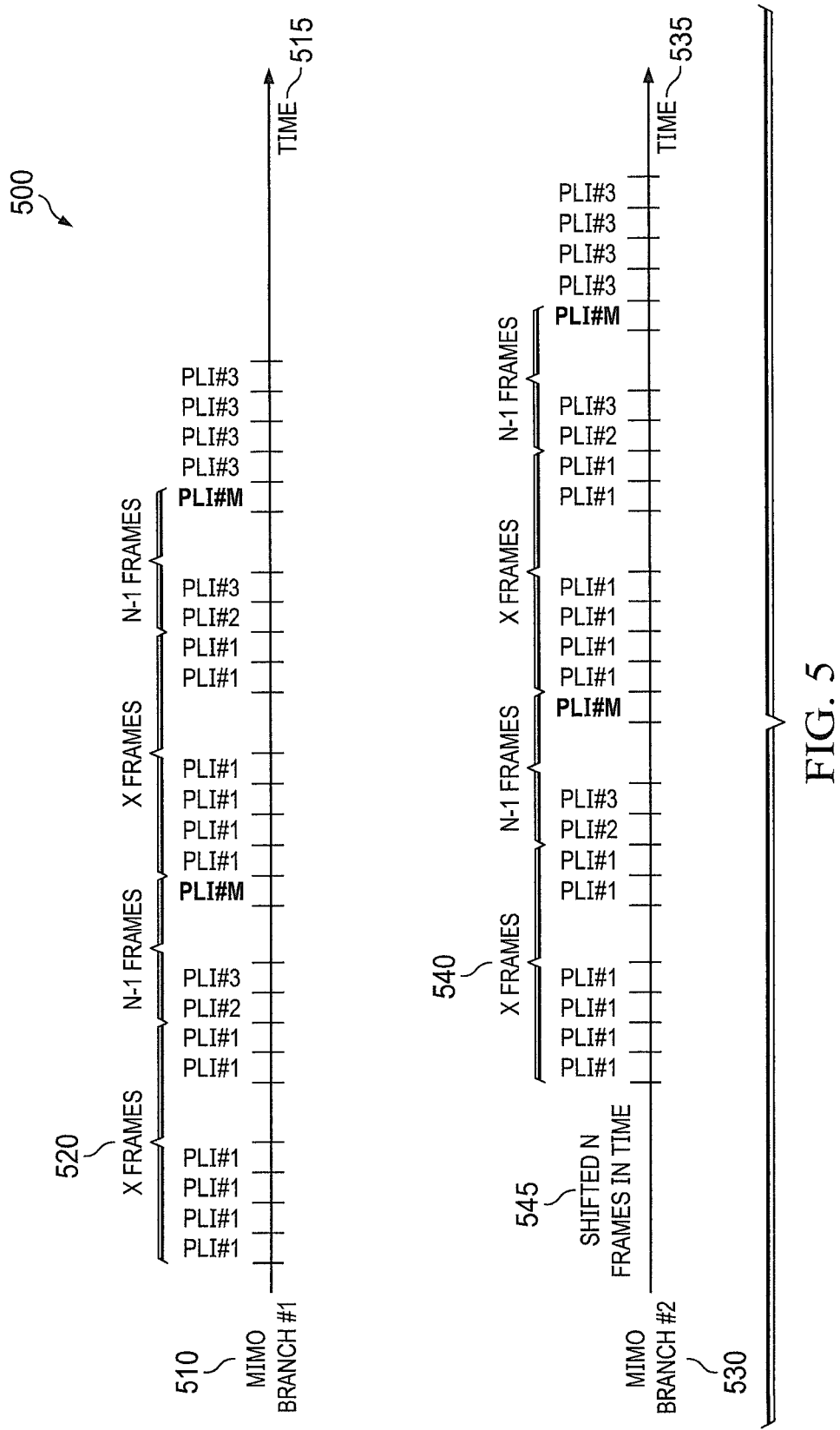
FIG. 5 is an illustration of diagrams of example MIMO branches demonstrating PL cycle intervals.

FIG. 5 is an illustration of diagrams of example MIMO branches demonstrating PL cycle intervals 500. PL cycle intervals 500 presents two MIMO branches with differing PL cycle intervals, where each PL cycle interval can check and monitor the set of available PLs to update the PLI downlink and uplink storage areas. PL cycle intervals 500 includes a MIMO branch 510 and a MIMO branch 530. There can be additional MIMO branches coupled to the gNB and UE. MIMO branch 510 has a time parameter 515 with multiple bracketed PL cycle intervals.

Bracket 520 shows the PL cycle interval is utilizing a number of communication frames as the PL cycle interval, for example, a specified x number of frames. In addition to the number of communication frames, the PL cycle interval can use a time interval, a request by the UE, a request by the gNB, and a time when the link quality threshold fails to be satisfied. MIMO branch 530 has a time parameter 535 with multiple bracketed PL cycle intervals. Bracket 540 is also utilizing x number of communication frames, though bracket 540 is shifted by offset 545, e.g., N number of frames, from MIMO branch 510. The offset 545 combined with the multiple MIMO branches, which have varying monitoring intervals, can provide a variety of PLs to choose from when selecting the best fit PL as communication conditions change.

Figure 6A:
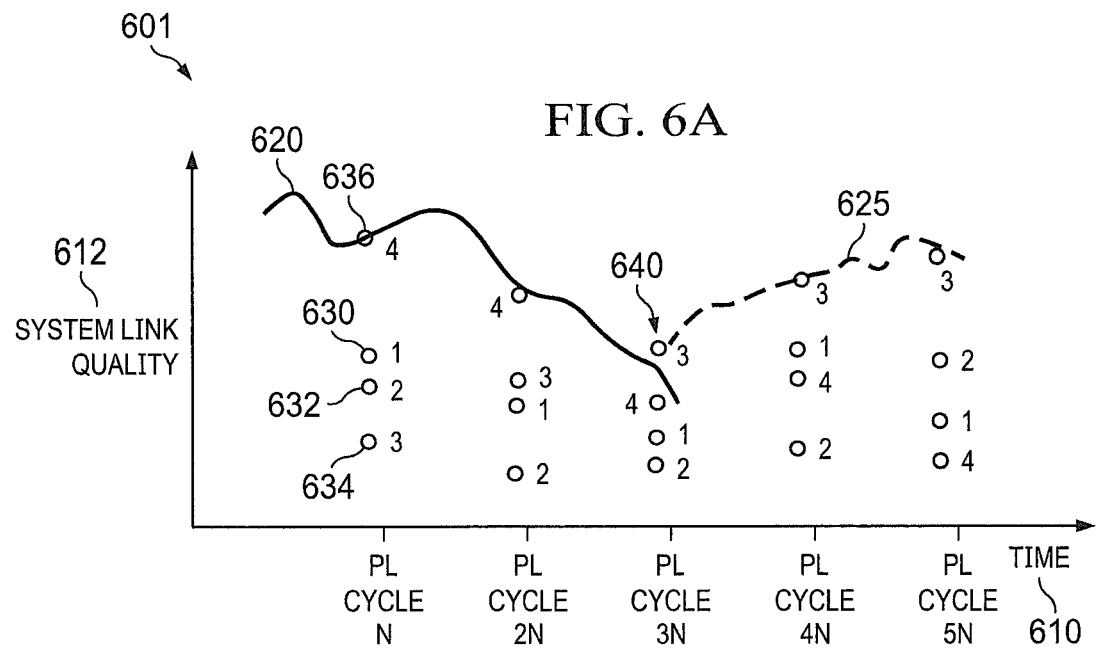
FIG. 6A is an illustration of a plot diagram of an example PL chart demonstrating fixed pattern monitoring using a single system link.

FIG. 6A is an illustration of a plot diagram of an example PL chart 601 demonstrating fixed pattern monitoring using a single system link. PL chart 601 shows an example process for selecting the best fit PL. PL chart 601 has an x-axis 610 for time. Time can be in various units, with seconds being a typical unit as the PL cycle interval can be one second, though other time values can be utilized. Y-axis 612 is a relative measure of system link quality that increases in the direction of the arrow.

Plot area of PL chart 601 contains data points representing the monitoring of each available PL that has been measured at a designated PL cycle interval of N. In this example, there are four PLs in the set of available PLs, indexed as one to four. Data point 630 is the PL indexed as PLI-1, data point 632 is the PL indexed as PLI-2, data point 634 is the PL indexed as PLI-3, and data point 636 is the PL indexed as PLI-4. As each PL cycle interval occurs, the results from the monitoring of the PLs are shown as the data points for each of the respective PL cycle intervals.

The gNB and UE are using PLI-4, where the quality monitoring is shown as solid line 620. Data point 636 is on solid line 620. Over time, the communication conditions can change where a different PL provides a higher system link quality. This occurs at time 640 where PLI-3 results in a higher system link quality than the other PLs and therefore becomes the selected PL, where the quality monitoring is shown as dashed line 625. The change in PL can occur at various appropriate times and can occur zero or more times during a communication session between the gNB and UE.

Figure 6B:
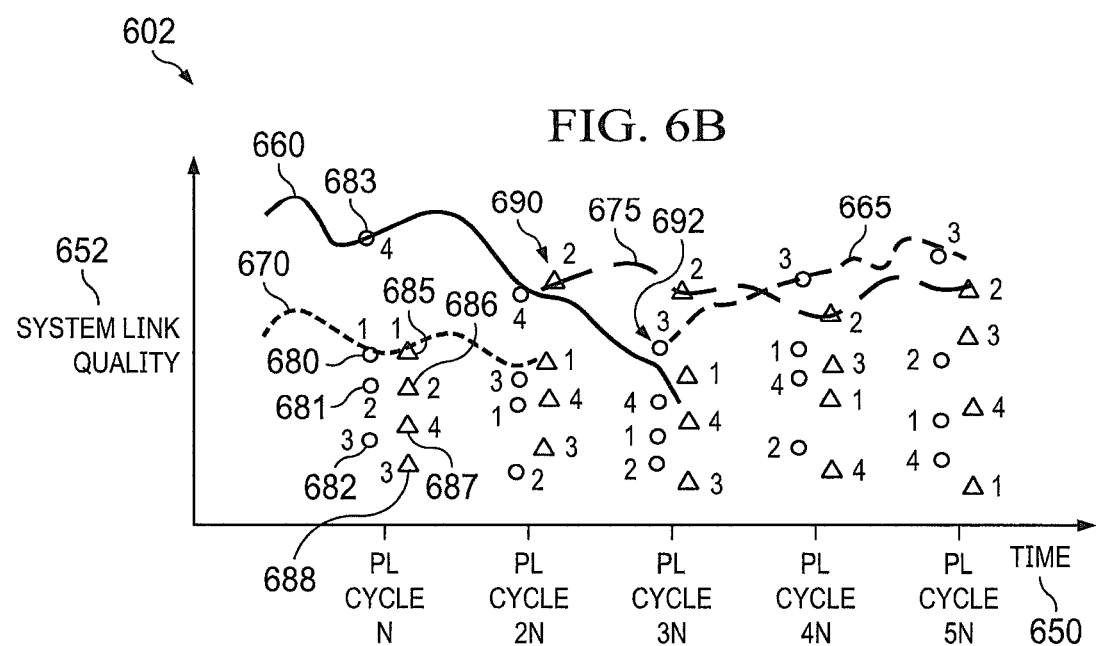
FIG. 6B is an illustration of a plot diagram of an example PL chart demonstrating fixed pattern monitoring using a dual system link.

FIG. 6B is an illustration of a plot diagram of an example PL chart 602 demonstrating fixed pattern monitoring using a dual system link. PL chart 602 is similar to PL chart 601 with the addition of multiple PLs, such as a separate PL for each of PUSCH and PDSCH, a separate PL for two or more MIMO branches for the same link, or a combination thereof. PL chart 602 has an x-axis 650 for time. Time can be in various units, with seconds being a typical unit as the PL cycle interval can be one second, though other time values can be utilized. Y-axis 652 is a relative measure of system link quality that increases in the direction of the arrow.

Plot area of PL chart 602 contains data points representing the monitoring of each available PL that has been taken at a designated PL cycle interval of N. In this example, there are four PLs in the set of available PLs, indexed as one to four. Data point 680 is the PL indexed as PLI-1 for the first system link, data point 681 is the PL indexed as PLI-2 for the first system link, data point 682 is the PL indexed as PLI-3 for the first system link, and data point 683 is the PL indexed as PLI-4 for the first system link. Data point 685 is the PL indexed as PLI-1 for the second system link, data point 686 is the PL indexed as PLI-2 for the second system link, data point 687 is the PL indexed as PLI-3 for the second system link, and data point 688 is the PL indexed as PLI-4 for the second system link. As each PL cycle interval occurs, the results from the monitoring of the PLs is shown as the data points for each of the respective PL cycle intervals.

The gNB and UE are using PLI-4 for the first system link, where the quality monitoring is shown as solid line 660. Data point 683 is on solid line 660. Over time, the communication conditions can change where a different PL provides a higher system link quality for the first system link. This occurs at time 692 where PLI-3 results in a higher system link quality than the other PLs and therefore becomes the selected PL, where the quality monitoring is shown as short dash line 665.

The gNB and UE are using PLI-1 for the second system link, where the quality monitoring is shown as dot line 670. Data point 685 is on dot line 670. Over time, the communication conditions can change where a different PL provides a higher system link quality for the second system link. This occurs at time 690 where PLI-2 results in a higher system link quality than the other PLs and therefore becomes the selected PL, where the quality monitoring is shown as long dash line 675. The change in PL can occur at various appropriate times and can occur zero or more times during a communication session between the gNB and UE. In addition, the PL changes can occur at different times for the PDSCH and PUSCH.

FIG. 7A is an illustration of a plot diagram of an example PL chart 701 demonstrating selecting a PL utilizing a link quality threshold. PL chart 701 in similar to PL charts 601 and 602 though PL chart 701 is highlighting a link quality threshold. PL chart 701 has an x-axis 710 for time. Y-axis 712 is a relative measure of system link quality that increases in the direction of the arrow.

Plot area of PL chart 701 contains data points representing the monitoring of each available PL that has been taken at a designated PL cycle interval of N. In this example, there are four PLs in the set of available PLs, indexed as one to four. Data point 730 is the PL indexed as PLI-1, data point 732 is the PL indexed as PLI-2, data point 734 is the PL indexed as PLI-3, and data point 736 is the PL indexed as PLI-4.

Link quality threshold 740 is shown as well. If the system link quality falls below link quality threshold 740, then the PLI analyzer of the gNB or UE can select the same or a new PLI configuration. In this example, PLI-4, as shown by data point 720, has been selected and the quality monitoring is shown as solid line 721. At a time point 745, the system link quality of PLI-4 falls below the link quality threshold 740 and the PL analyzer has selected PLI-3 to be the new PL to be utilized. The quality monitoring is shown as dash line 725.

FIG. 7B is an illustration of a plot diagram of an example PL chart 702 demonstrating selecting a PL where all PLs are below the link quality threshold. PL chart 702 in similar to PL charts 601, 602, and 701 though PL chart 702 is highlighting a link quality threshold where all the PLs are below the link quality threshold. PL chart 702 has an x-axis 750 for time. Y-axis 752 is a relative measure of system link quality that increases in the direction of the arrow.

Plot area of PL chart 702 contains data points representing the monitoring of each available PL that has been taken at a designated PL cycle interval of N. In this example, there are four PLs in the set of available PLs, indexed as one to four. Data point 770 is the PL indexed as PLI-1, data point 772 is the PL indexed as PLI-2, data point 774 is the PL indexed as PLI-3, and data point 776 is the PL indexed as PLI-4.

Link quality threshold 780 is shown as well. If the system link quality falls below link quality threshold 780, then the PLI analyzer of the gNB or UE can select the same or a new PLI configuration. In this example, PLI-4 is being utilized, as indicated by data point 776 and where the quality monitoring is shown as solid line 760. At a time point 785, the system link quality of PLI-4 falls below the link quality threshold 780 and the PL analyzer has selected PLI-1 to be the new PL to be utilized. The quality monitoring is shown as dot-dot line 762. PLI-1 is below the link quality threshold 780, though it is a best fit PLI configuration since it has the highest relative system link quality at that point in time. At a subsequent PLI cycle interval, PLI-3 rises above the link quality threshold 780 and is selected as the new best fit PLI configuration and the quality monitoring is shown as dash line 765. This occurs at a time point 787.

Figure 8A:
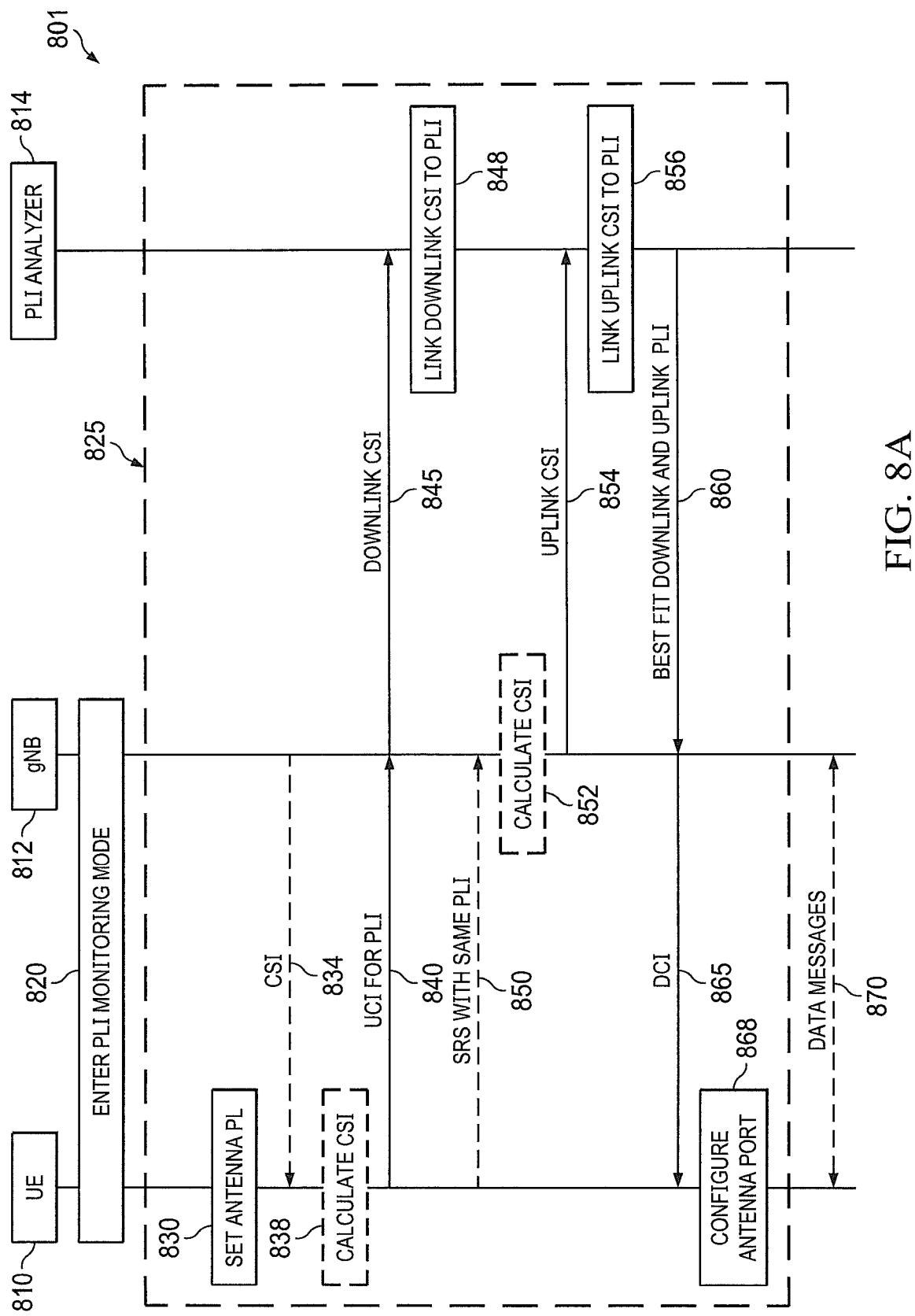
FIG. 8A is an illustration of a cross functional flow diagram of an example PL signaling chart for monitoring at the UE.

FIG. 8A is an illustration of a cross functional flow diagram 801 of an example PL signaling chart for monitoring at the UE. Cross functional flow diagram 801, e.g., a swim lane diagram, shows the PLI monitoring process (shown using solid lines) overlaid with existing 3GPP Rel. 15 processes (shown using dashed lines). There are three actors in cross functional flow diagram 801, UE 810, gNB 812, and PLI analyzer 814. In this example, PLI analyzer 814 is shown as connected to or part of gNB 812. In other aspects, PLI analyzer 814 can be connected to or part of UE 810. In yet other aspects, UE 810 and gNB 812 can each have a respective PLI analyzer 814. In other aspects, PLI analyzer 814 can be part of respective UE 810 and gNB 812 such as being incorporated into circuitry, ROM, RAM, and memory, and be functional code such as an application code, module, function, library, dynamic link library, and other functional code representations. The flows that are shown with dashes are those flows that typically occur in current communication processing. The solid boxes and arrows are flows introduced as an example implementation of the disclosures herein.

In flow 820, UE 810 and gNB 812 can begin the PLI monitoring, such as at each PL cycle interval. In flow 830, UE 810 can configure its antenna port to a default PL or to the last selected PL as provided by gNB 812. UE 810 can utilize a standard CSI or an expanded CSI. In flow 834, gNB 812 can transmit a CSI to UE 810. The CSI includes PLI information for UE 810 to process. In flow 838, UE 810 can calculate CSI parameters, including PL quality parameters utilizing the received CSI.

In flow 840, UE 810 transmits to gNB 812 a UCI which includes the calculated CSI parameters from flow 838 and the configured PLI. gNB 812 stores the received downlink CSI, via flow 845, using PLI analyzer 814. PLI analyzer 814 can store the downlink CSI in a storage area, such as a PLI table. PLI analyzer, in flow 848 can link the received CSI parameters with the configured PLI at the UE and gNB.

In flow 850, UE 810 can transmit its SRS using the same PLI as was used in the previous UCI of flow 840. gNB 812 can calculate the CSI parameters in flow 852 utilizing the received SRS signals, similar to flow 838 at UE 810. gNB 812 can store the uplink CSI, via flow 854, using PLI analyzer 814. Uplink CSI can be stored and linked to the PLI in flow 856 similarly as flow 848.

PLI analyzer 814 can analyze the storage area and select the best fit PLI configuration, such as a PLI configuration that satisfies the link quality threshold and minimizes power consumption and minimizes system processing time. PLI analyzer 814 can balance these factors utilizing provided operational parameters. The downlink and uplink PLI configuration can be the same or a different PLI configuration. The best fit PLI configuration is sent to gNB 812 via flow 860 and transmitted to UE 810 using DCI via flow 865. In flow 868, UE 810 configures its antenna ports according to the received DCI parameters.

Flows 830 to 868 can be grouped together as PLI flows 825. PLI flows 825 can be repeated for each of the PLs in the set of available PLs. At any time during the monitoring process of the set of available PLs, or during a time when monitoring is not occurring, UE 810 and gNB 812 can send data messages, e.g., PDSCH and PUSCH, such as shown in flow 870. Flow 870 will use the respective best fit PLI configuration that was transmitted in DCI of flow 865. The current best fit PLI configuration can continue to be utilized until PLI analyzer 814 indicates, at a subsequent PLI flows 825, that a different best fit PLI should be utilized.

Figure 8B:
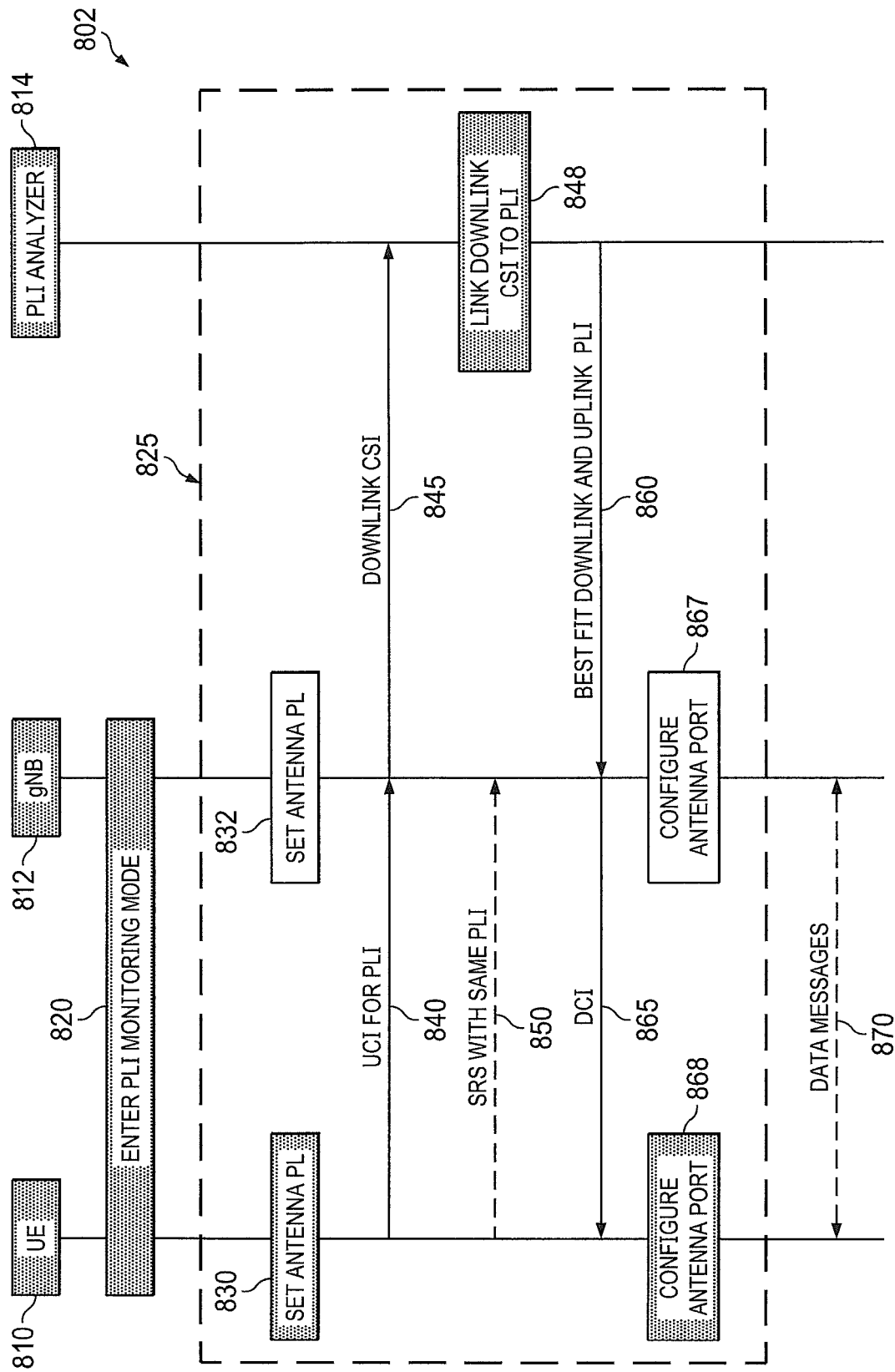
FIG. 8B is an illustration of a cross functional flow diagram of an example PL signaling chart for monitoring at the UE and gNB.

FIG. 8B is an illustration of a cross functional flow diagram 802 of an example PL signaling chart for monitoring at the UE and gNB. Cross functional flow diagram 802 is similar to cross functional flow diagram 801, with a difference that gNB 812 can also adjust its antenna ports utilizing information received from UE 810. The shaded boxes represent flows that are similar to cross functional flow diagram 801. The white boxes are new flows.

At a time when flow 830 configures the antenna ports on UE 810, flow 832 can configure the antenna ports on gNB 812. A default PLI configuration can be used or the then current best fit PLI configuration can be used to configure the antenna port on gNB 812. After PLI analyzer 814 has communicated an updated best fit PLI configuration to gNB 812, flow 867 can be used to re-configure the antenna ports on gNB 812. PLI flow 825 is repeated more often in this aspect since gNB 812 is also re-configuring antenna ports leading to additional potential combinations of PLs to monitor and evaluate. The remaining flows are similar to cross functional flow diagram 801.

Figure 9A:
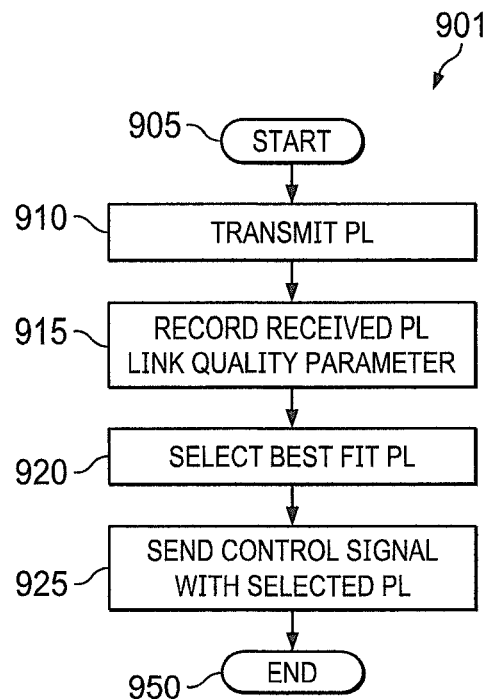
FIG. 9A is an illustration of a flow diagram of an example method to select a best fit PL.

FIG. 9A is an illustration of a flow diagram of an example method 901 to select a best fit PL. Method 901 can be implemented by a communication system, such as between a UE and gNB. The gNB, the UE, or both, can perform the actions described in the method, specifically tracking the PL quality parameters associated with a PL and selecting a best fit PLI configuration.

Method 901 starts at a step 905 and proceeds to a step 910. In step 910, the primary communication device for the process, such as the gNB, can transmit on a given PL using a given PLI configuration. The PLI configuration can be a default PLI configuration (such as for a new communication link between the gNB and UE), a pre-configured PLI through RRC communication, or selected from the set of available PLs once communications have been established. The given PLI can be transmitted through a control channel, e.g., DCI. Step 910, in some aspects, can be directed by operations of a computer program product. In a step 915, the UE transmits its PLI and PL quality parameters together with the configured PLI to the gNB, and the gNB can record the PL quality parameter for the PLI utilized in communicating with the UE. The UE can analyze and calculate the PL quality parameters at the UE using the received control signals prior to transmitting to the gNB. The gNB can store the PL quality parameters and associated PLI in a storage area, such as a PLI table.

In a step 920, the gNB, for example using a PLI analyzer, selects the best fit PLI configuration at that time point. The best fit PLI configuration can be one that satisfies a PL efficiency threshold. PL efficiency can be satisfied by satisfying a link quality threshold, minimizing processing time, minimizing storage space, minimizing cost, minimizing time to complete a PL cycle interval, and other factors to improve the processing at the UE and gNB, such as selecting a PLI configuration that can be handled with more efficiency at the gNB or UE taking into account the specific hardware being used. In a step 925, the selected PLI is communicated to the UE, sent using a control signal, reference signal, or other type of indication, and used for subsequent control signals, reference signals, and data messages until overridden by a new selected best fit PLI configuration. Step 925, in some aspects, can be scheduled by operations of a computer program product at the first transceiver. Method 901 ends at a step 950.

Figure 9B:
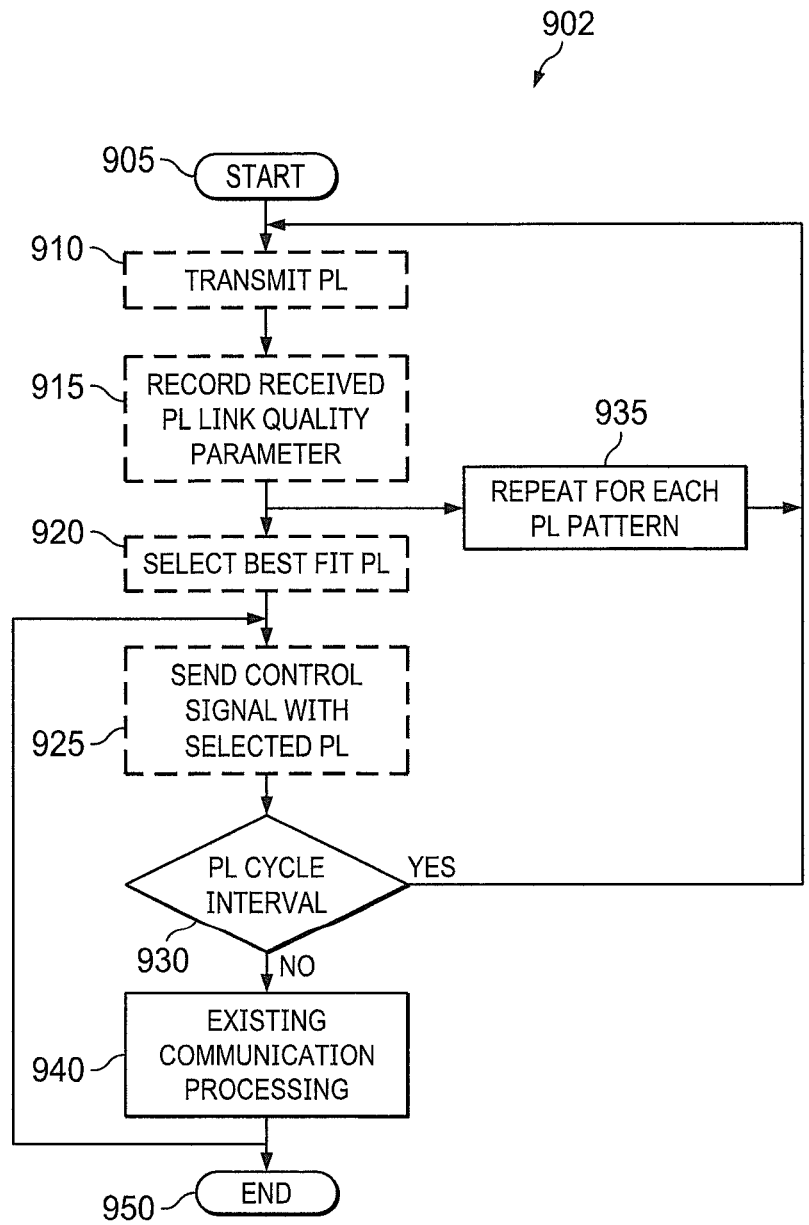
FIG. 9B is an illustration of a flow diagram of an example method to select a best fit PL while monitoring available PLs.

FIG. 9B is an illustration of a flow diagram of an example method 902 to select a best fit PLI configuration while monitoring available PLs. Method 902 is similar to method 901 and shares several of the same steps. Starting at step 905, method 902 proceeds to step 910 and 915. At step 915, method 902 proceeds to step 935 if there are remaining PLs in the set of available PLs that have not yet been monitored for this PL cycle interval. Step 935 can select the next available PL and use that PL to measure PL quality parameters. The PLI storage area is updated with the new PL quality parameters, where repeated PLIs are overridden with the newer parameters.

The set of available PLs used in step 935 can be culled, forming a sub-set of PLs from the potential PLs using various factors, such as which PL is supported by both the gNB and UE, which PLs have consistently fallen below the link quality threshold, which PLs that do not satisfy the PL efficiency threshold, and other factors.

Once the set of available PLs is exhausted, the method 902 resumes at step 920 and proceeds to step 925. Step 925 proceeds to a decision step 930. Decision step 930 determines if another PL cycle interval has started. The PL cycle interval can be a time interval, such as one second, a number of frames communicated, such as X frames, on request by the UE or gNB, or if the PL fails to satisfy the link quality threshold. If the resultant is 'yes', then the method 902 proceeds to step 910 where each of the PLs in the set of available PLs is measured for its PL quality parameters.

If the resultant is 'no', then the method 902 proceeds to a step 940 where conventional communication processing occurs, such as continuing to send data messages as provided in step 925, or proceeding to step 950 to stop communications and end method 902. Other conventional communication tasks can also take place in step 940.

Figure 10:
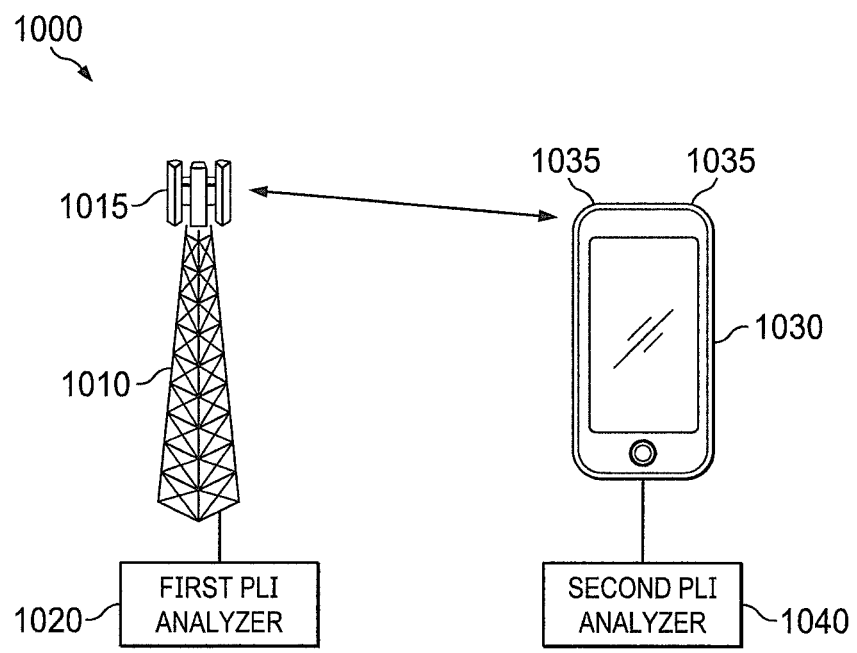
FIG. 10 is an illustration of a diagram of an example gNB/UE communication system using dynamically selected PLs.

FIG. 10 is an illustration of a diagram of an example gNB/UE communication system 1000 using dynamically selected PLs. gNB/UE communication system 1000 demonstrates a potential communication system between a gNB and a UE using a process that can dynamically monitor and select best fit PLs at periodic intervals. gNB/UE communication system 1000 includes a first transceiver, such as gNB 1010 with one or more MIMO antenna branches 1015. gNB 1010 also includes a first PLI analyzer 1020. In addition, there is a second transceiver, such as UE 1030 with one or more MIMO antenna branches 1035 and a second PLI analyzer 1040. In an alternate aspect, first transceiver can be UE 1030 and second transceiver can be gNB 1010.

First PLI analyzer 1020 can store the PL quality parameters and associated PLI. The storage area can be a memory, RAM, hard disk, cache, solid state drive, server, or other storage mechanisms, and stored as a database table, file, or other format that can associate the PL quality parameters with the PLI. First PLI analyzer 1020 can also select a best fit PLI configuration utilizing the stored PL quality parameters in the storage area. The best fit PLI configuration can be communicated to the second transceiver and used for PDSCH and PUSCH. The second PLI analyzer can have similar functionality at the second transceiver. First PLI analyzer 1020 can also track the PL cycle interval and initiate a new monitoring cycle of the set of available PLs utilizing various PL cycle intervals, such as a time interval, a number of communication frames, a request of the first or second transceiver, or a time when the current PL quality parameter fails to satisfy the link quality threshold.

gNB 1010 can utilize the selected best fit PLI configuration to adjust the radiation pattern used by MIMO antenna branch 1015. gNB 1010 can have additional MIMO antenna branches, each with their own selected PLI configuration from the set of available PLs. Similarly, UE 1030 can utilize the selected best fit PLI configuration to adjust the radiation pattern used by MIMO antenna branch 1035. MIMO antenna branch 1035 and MIMO antenna branch 1015 can use different PLI for transmitting messages, as long as the receiver has been informed of the PLI configuration being utilized.

A portion of the above-described apparatus, systems or methods may be embodied in or performed by various digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/ or read-only memory (ROM), to enable various types of digital data processors or computers to perform one, multiple or all of the steps of one or more of the above-described methods, or functions, systems or apparatuses described herein.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

What is claimed is:

1. A method, comprising:
   transmitting a first propagation link (PL) index (PLI) configuration, from a PLI, in a downlink or uplink control signal from a first transceiver to a second transceiver, wherein the PLI characterizes and monitors available PLs between an antenna port of the first transceiver and an antenna port of the second transceiver and the first transceiver is one of a base station (gNB) or a user equipment (UE) and the second transceiver is an other one of the gNB or the UE;
   recording, at the first transceiver, a received first PL quality parameter associated with the first PLI configuration, as part of a set of system link quality parameters, wherein the first PL quality parameter is estimated at the second transceiver utilizing an analysis of the control signal using the first PLI configuration;
   selecting a first best fit PLI configuration from the PLI utilizing the set of system link quality parameters; and
   sending a subsequent indication from the first transceiver identifying the first best fit PLI configuration, and the second transceiver utilizes the first best fit PLI configuration for ensuing communications.

2. The method as recited in claim 1, wherein the first PL quality parameter is further determined using an analysis of an uplink reference signal, and the second transceiver utilizes frequency division duplexing (FDD).

3. The method as recited in claim 1, wherein the transmitting transmits the first PLI configuration for downlink communications and an uplink PLI configuration for uplink communications, an uplink PL quality parameter is determined at the first transceiver from an analysis of the uplink PLI configuration derived from an uplink reference signal, and the selecting further comprises selecting an uplink best fit PLI configuration utilized by the second transceiver for uplink communications, where the first best fit PLI configuration is utilized by the second transceiver for downlink communications, and the first transceiver and the second transceiver utilize time division duplexing (TDD).

4. The method as recited in claim 3, wherein the first best fit PLI configuration and the uplink best fit PLI configuration are the same PLI configuration.

5. The method as recited in claim 1, further comprising:
storing a second PL quality parameter associated with a second PLI configuration, as part of the set of system link quality parameters, stored at the first transceiver, wherein the second PL quality parameter is determined at the second transceiver from an analysis of the downlink reference signal where the first transceiver utilizes the second PLI configuration, and the first PL quality parameter is associated with the second PL quality parameter; and
determining a second best fit PLI configuration from the set of system link quality parameters wherein the first transceiver utilizes the second best fit PLI configuration for ensuing communications.

6. The method as recited in claim 5, wherein the first PL quality parameter and the second PL quality parameter are further determined using an analysis of a first uplink reference signal, and the first transceiver utilizes FDD.

7. The method as recited in claim 6, further wherein the transmitting transmits the first PLI configuration for downlink communications and a third PLI configuration for uplink communications by the second transceiver, a third PL quality parameter is determined at the first transceiver from an analysis of the third PLI configuration received from a second uplink reference signal, the selecting further comprises selecting a third best fit PLI configuration utilized by the second transceiver for uplink communications and the first best fit PLI configuration is utilized by the second transceiver for downlink communications, and the first transceiver and the second transceiver utilize TDD.

8. The method as recited in claim 7, further comprising:
storing a fourth PL quality parameter associated with a fourth PLI configuration, as part of the set of system link quality parameters, stored at the first transceiver, wherein the fourth PL quality parameter is determined at the first transceiver from an analysis of the second uplink reference signal where the first transceiver utilizes the fourth PLI configuration; and
determining a fourth best fit PLI configuration from the set of system link quality parameters wherein the first transceiver utilizes the fourth best fit PLI configuration for ensuing uplink communications, and the first transceiver utilizes the second best fit PLI configuration for ensuing downlink communications.

9. The method as recited in claim 1, further comprising:
repeating the transmitting and the recording for each PL in the set of available PLs, and wherein the selecting further comprises analyzing the PL utilizing a link quality threshold.

10. The method as recited in claim 9, wherein the repeating is executed at one or more PL cycle intervals, and wherein the PL cycle interval is one or more of a time interval, a number of communication frames, a request by the UE, a request by the gNB, or a time when the link quality threshold fails to be satisfied utilizing the set of system link quality parameters.

11. The method as recited in claim 1, wherein the selecting selects the PLI nearest the link quality threshold when no PLI satisfies the link quality threshold.

12. The method as recited in claim 1, wherein the selecting selects the PLI, from a sub-set of PLIs that satisfy the link quality threshold, using the PL efficiency threshold.

13. The method as recited in claim 1, wherein the recording the PL quality parameter further utilizes communication parameters received from a sounding reference signal (SRS) or a channel state information (CSI) reference signal.

14. A system, comprising:
a first transceiver capable of transceiving reference signals and control signals using a configuration of a propagation link (PL) index (PLI);
a second transceiver communicatively coupled to the first transceiver and capable of transceiving reference signals and control signals using a first transceiver PLI configuration, wherein the PLI characterizes and monitors available PLs between an antenna port of the first transceiver and an antenna port of the second transceiver; and
wherein the first transceiver further comprises:
a PLI analyzer capable of recording PL quality parameters as a set of system link quality parameters, wherein the PL quality parameters are determined at the first transceiver or the second transceiver, and selecting one or more best fit PLI configurations from the PLI to be utilized by the first transceiver and the second transceiver, wherein the selecting utilizes the set of system link quality parameters, a link quality threshold, and a PL efficiency threshold.

15. The system as recited in claim 14, wherein the PLI analyzer selects a first best fit PLI configuration for use by the second transceiver for downlink communications, and a third best fit PLI configuration for use by the second transceiver for uplink communications.

16. The system as recited in claim 15, wherein the PLI analyzer selects a second best fit PLI configuration for use by the first transceiver for downlink communications, and a fourth best fit PLI configuration for use by the first transceiver for uplink communications.

17. The system as recited in claim 14, wherein the first transceiver is further capable of transceiving more than one control or reference signal where each control and reference signal utilizes a different PLI configuration from a set of available PLs, and the PLI analyzer records the respective PL quality parameter received from the second transceiver for each PLI configuration.

18. The system as recited in claim 17, wherein the transceiving more than one control or reference signal is repeated at a PL cycle interval, wherein the PL cycle interval is determined by the PLI analyzer and is one or more of a time interval, a number of communication frames, a request by the first transceiver, a request by the second transceiver, or a time when the link quality threshold fails to be satisfied.

19. The system as recited in claim 14, wherein the first transceiver is one of a fifth-generation (5G) base station (gNB) or a user equipment (UE), and the second transceiver is the other of the gNB and UE.

20. A computer program product having a series of operating instructions stored on a non-transitory computer-readable medium that directs a data processing apparatus when executed thereby to perform operations, the operations comprising:

directing a transmission of a first propagation link (PL) index (PLI) configuration, from PLI, in a downlink or uplink control signal from a first transceiver to a second transceiver, wherein the PLI characterizes and monitors available PLs between an antenna port of the first transceiver and an antenna port of the second transceiver and the first transceiver is one of a base station (gNB) or a user equipment (UE) and the second transceiver is an other one of the gNB or the UE;

recording, at the first transceiver, a received first PL quality parameter associated with the first PLI configuration, as part of a set of system link quality parameters, wherein the first PL quality parameter is estimated at the second transceiver utilizing an analysis of the control signal using the first PLI configuration;

selecting a first best fit PLI configuration from the PLI utilizing the set of system link quality parameters; and scheduling the first transceiver to send a subsequent indication from the first transceiver identifying the first best fit PLI configuration, and the second transceiver utilizes the first best fit PLI configuration for ensuing communications.

\* \* \* \* \*

UNITED STATES PATENT AND TRADEMARK OFFICE
CERTIFICATE OF CORRECTION

PATENT NO. : 11,139,868 B2  
APPLICATION NO. : 16/680534  
DATED : October 5, 2021  
INVENTOR(S) : Simon Svendsen et al.

It is certified that error appears in the above-identified patent and that said Letters Patent is hereby corrected as shown below:

In the Specification

In Column 4, Line 45, after --patterns (see-- delete "FIG. A" and insert --FIG. 1A--

Signed and Sealed this  
Twenty-third Day of November, 2021

Drew Hirshfeld  
*Performing the Functions and Duties of the*  
*Under Secretary of Commerce for Intellectual Property and*  
*Director of the United States Patent and Trademark Office*